(12) United States Patent
Smith et al.

(10) Patent No.: US 12,375,488 B2
(45) Date of Patent: Jul. 29, 2025

(54) ATTESTATION VERIFIER ROLE DELEGATION

(71) Applicant: Intel Corporation, Santa Clara, CA (US)

(72) Inventors: Ned M. Smith, Beaverton, OR (US); Junyuan Wang, Shanghai (CN); Kaijie Guo, Shanghai (CN); Zijuan Fan, Shanghai (CN); Weigang Li, Shanghai (CN); Lihui Zhang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 185 days.

(21) Appl. No.: 18/008,743

(22) PCT Filed: Jul. 7, 2021

(86) PCT No.: PCT/US2021/040681
§ 371 (c)(1),
(2) Date: Dec. 7, 2022

(87) PCT Pub. No.: WO2022/011009
PCT Pub. Date: Jan. 13, 2022

(65) Prior Publication Data
US 2023/0216849 A1 Jul. 6, 2023

Related U.S. Application Data

(60) Provisional application No. 63/050,988, filed on Jul. 13, 2020, provisional application No. 63/049,442, filed on Jul. 8, 2020.

(51) Int. Cl.
*H04L 9/40* (2022.01)

(52) U.S. Cl.
CPC ......... *H04L 63/0884* (2013.01); *H04L 63/20* (2013.01)

(58) Field of Classification Search
CPC ... H04L 63/0884; H04L 63/20; H04L 9/3265; H04L 9/321; H04L 9/3234; H04L 63/0281; G06F 21/57
(Continued)

(56) References Cited

U.S. PATENT DOCUMENTS 10,735,205 B1 * 8/2020 Wentz .................. H04L 9/3257
2017/0024570 A1 * 1/2017 Pappachan ............. G06F 13/28
(Continued)

FOREIGN PATENT DOCUMENTS

| DE | 112021003656 | 5/2023 |
|---|---|---|
| WO | WO-2021073376 A1 | 4/2021 |
| WO | WO-2022011009 A1 | 1/2022 |

OTHER PUBLICATIONS

NPL Search Terms (Year: 2024).*
(Continued)

*Primary Examiner* — Syed A Zaidi
(74) *Attorney, Agent, or Firm* — Schwegman Lundberg & Woessner, P.A.

(57) ABSTRACT

Various examples of device and system implementations and methods for performing attestation delegation operations are disclosed. In an example, attestation operations are performed by a verifier, including: obtaining endorsement information for attestation of an entity; obtaining an appraisal policy for evaluation of attestation evidence for the attestation of the entity; determining, based on the endorsement information and the appraisal policy, that delegation to a delegate verifier entity is permitted to perform the attestation of the entity; and providing, to the delegate verifier entity, a delegation command to perform the attestation of the entity, wherein the delegation command authorizes the
(Continued)

delegate verifier entity to perform attestation operations (e.g., verifier operations) for a domain of entities including the entity.

24 Claims, 19 Drawing Sheets

(58) Field of Classification Search
USPC .......................................................... 726/7, 4
See application file for complete search history.

(56) References Cited

U.S. PATENT DOCUMENTS

| 2017/0272415 | A1* | 9/2017 | Zhao | H04L 63/0807 |
| 2017/0317889 | A1* | 11/2017 | Moon | H04L 67/10 |
| 2019/0014117 | A1* | 1/2019 | Li | H04L 67/14 |
| 2019/0036700 | A1* | 1/2019 | Sundaresan | H04L 9/30 |
| 2019/0243963 | A1* | 8/2019 | Soriente | H04L 9/3247 |
| 2020/0084202 | A1* | 3/2020 | Smith | H04W 12/08 |
| 2020/0266983 | A1* | 8/2020 | Medvinsky | H04L 9/0897 |
| 2021/0011984 | A1* | 1/2021 | Renke | G06F 21/79 |

OTHER PUBLICATIONS

Siris VA, Dimopoulos D, Fotiou N, Voulgaris S, Polyzos GC. OAuth 2.0 meets blockchain for authorization in constrained IoT environments. In2019 IEEE 5th World Forum on Internet of Things (WF-IoT) Apr. 15, 2019 (pp. 364-367). IEEE (Year: 2019).*
NPL Search Terms (Year: 2025).*
"International Application Serial No. PCT/US2021/040681, International Search Report mailed Oct. 21, 2021", 4 pgs.
"International Application Serial No. PCT/US2021/040681, Written Opinion mailed Oct. 21, 2021", 4 pgs.
Birkholz, H, "Remote Attestation Procedures Architecture", draft-ietf-rats-architecture-12 RATS Working Group, (Apr. 2021), 53 pgs.
George, Coker, et al., "Principles of Remote Attestation", International Journal of Information Security, (Jun. 2011).
Thomas, Hardjono, et al., "An Attestation Architecture for Blockchain Networks", arXiv, (May 8, 2020).
"International Application Serial No. PCT US2021 040681, International Preliminary Report on Patentability mailed Jan. 19, 2023", 6 pgs.

* cited by examiner

BACKGROUND CHECK MODEL

MULTI-PARTY BACKGROUND CHECK MODEL

PASSPORT MODEL

RECURSIVE ATTESTATION AS
TRUST ESTABLISHMENT FOR DELEGATED VERIFIER ROLE

ATTESTATION VERIFIER ROLE DELEGATION

PRIORITY CLAIM

This application is a U.S. National Stage Application under 35 U.S.C. 371 from International Application No. PCT/US2021/040681, filed Jul. 7, 2021, published as WO 2022/011009, which claims the benefit of priority to: United States Provisional Patent Application No. 63/049,442, filed Jul. 8, 2020; and U.S. Provisional Patent Application No. 63/050,988, filed Jul. 13, 2020; all of which are incorporated by reference herein in their entirety.

TECHNICAL FIELD

Embodiments described herein generally relate to data processing, security and attestation techniques, and computing hardware configurations to implement such techniques.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing use cases in mobile network settings have been developed for integration with multi-access edge computing (MEC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (devices, hosts, tenants, service providers, operators) are involved.

In a similar manner, Internet of Things (IoT) networks and devices are designed to offer a distributed compute arrangement, from a variety of endpoints. IoT devices are physical or virtualized objects that may communicate on a network, and may include sensors, actuators, and other input/output components, which may be used to collect data or perform actions in a real world environment. For example, IoT devices may include low-powered endpoint devices that are embedded or attached to everyday things, such as buildings, vehicles, packages, etc., to provide an additional level of artificial sensory perception of those things. Recently, IoT devices have become more popular and thus applications using these devices have proliferated.

The deployment of various Edge, Fog, MEC, and IoT networks, devices, and services have introduced a number of advanced use cases and scenarios occurring at and towards the edge of the network. However, these advanced use cases have also introduced a number of corresponding technical challenges relating to security, processing and network resources, service availability and efficiency, among many other issues, especially as more types of computing systems and configurations are deployed. One such challenge is in relation to security and trust, and the verification of participants as being a trusted entity or being trusted or authorized to perform some action. In this context, attestation is used to confirm the truthfulness of some claim or assertion (for instance, that a particular entity has rights to access some data, perform some action, etc.).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, methods, configurations, and related apparatuses are disclosed for entity attestation techniques. The following examples discuss specific aspects of delegating the roles of verifiers in complex settings, such as those experienced in complex edge or IoT computing networks with a variety of distributed computing devices.

The following introduces and operates a delegation mechanism that allows an existing verifier to authorize another entity to dynamically take on an attestation role. Specifically, this another entity can be authorized to dynamically take on the attestation role of a verifier referred to herein as an "extended verifier."

In a configuration for use of an extended verifier, the existing verifier attests and appraises the attester who requests to be an extended verifier. If the existing verifier's appraisal is successful, the existing verifier authorizes delegation of the attestation verifier role to the attester as an extended verifier. The extended verifier is authorized to perform the role of attestation verifier for some or all of its downstream devices. This extended verifier also may be authorized to recursively delegate attestation verifier role privileges further to other attesters that are joining, re-joining, or already joined to the network or trusted domain.

Among other benefits, the following attestation techniques may be used to (a) scale out a verifier role into the network dynamically to balance the workload; (b) hide or increase privacy of customer-sensitive activity within the subnet from the service provider; and (c) enable a trusted interconnect between different groups, for instance, between trusted enclaves from different CPU sockets. These attestation techniques may be implemented within software controllable interfaces, and a variety of software and network implementations.

Specifically, the present techniques and configurations for attestation may be utilized in connection with many aspects of deployed devices, including with reference to Edge Cloud, IoT, Multi-access Edge Computing (MEC), and other distributed computing deployments. However, the presently disclosed techniques may relate to other computing configurations and architectures, and are not limited to the use in a distributed computing environment. An example introduction of edge computing and IoT devices is provided below, followed by a detailed discussion of the present device attestation scenarios.

Example Edge Computing Architectures

Figure 1:
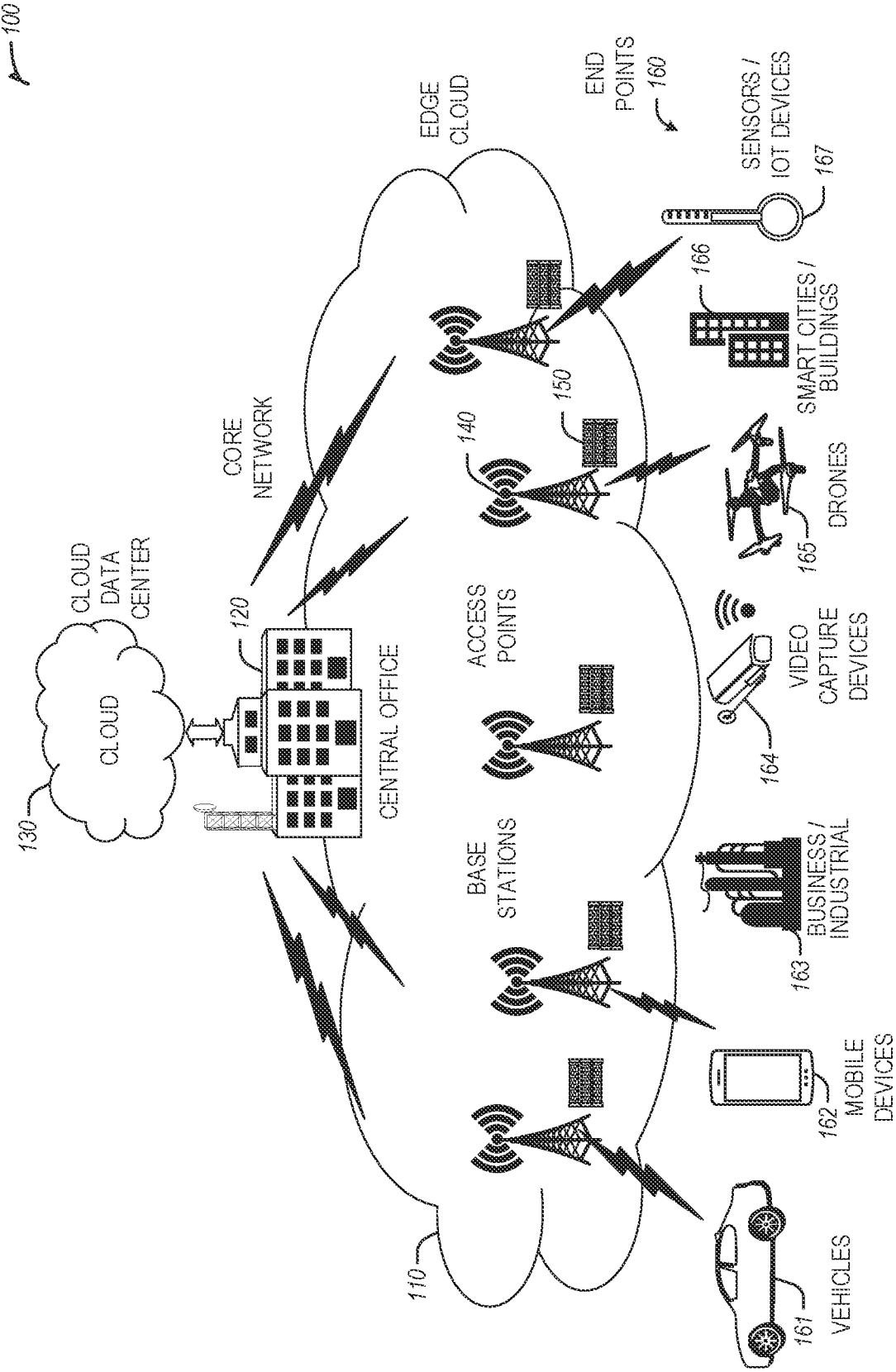
FIG. 1 illustrates an overview of an edge cloud configuration for edge computing, according to an example.

FIG. 1 is a block diagram 100 showing an overview of a configuration for edge computing, which includes a layer of processing referenced in many of the current examples as an "edge cloud". This network topology, which may include a number of conventional networking layers (including those not shown herein), may be extended through use of the attestation techniques and network configurations discussed herein.

As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer end point devices than at a base station or at a central office). However, the closer that the edge location is to the endpoint (e.g., UEs), the more that space and power is constrained. Thus, edge computing, as a general design principle, attempts to minimize the amount of resources needed for network services, through the distribution of more resources which are located closer both geographically and in-network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86, AMD or ARM hardware architectures) implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. Within edge computing networks, there may be scenarios in services in which the compute resource will be "moved" to the data, as well as scenarios in which the data will be "moved" to the compute resource. Or as an example, base station compute, acceleration and network resources can provide services to scale to workload demands on an as-needed basis by activating dormant capacity (subscription, capacity-on-demand) to manage corner cases, emergencies or to provide longevity for deployed resources over a significantly longer implemented lifecycle. These and other scenarios may involve the use of attestation, as provided in the discussion below.

In contrast to the network architecture of FIG. 1, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage and processing as well as remote cloud data-center based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Figure 2:
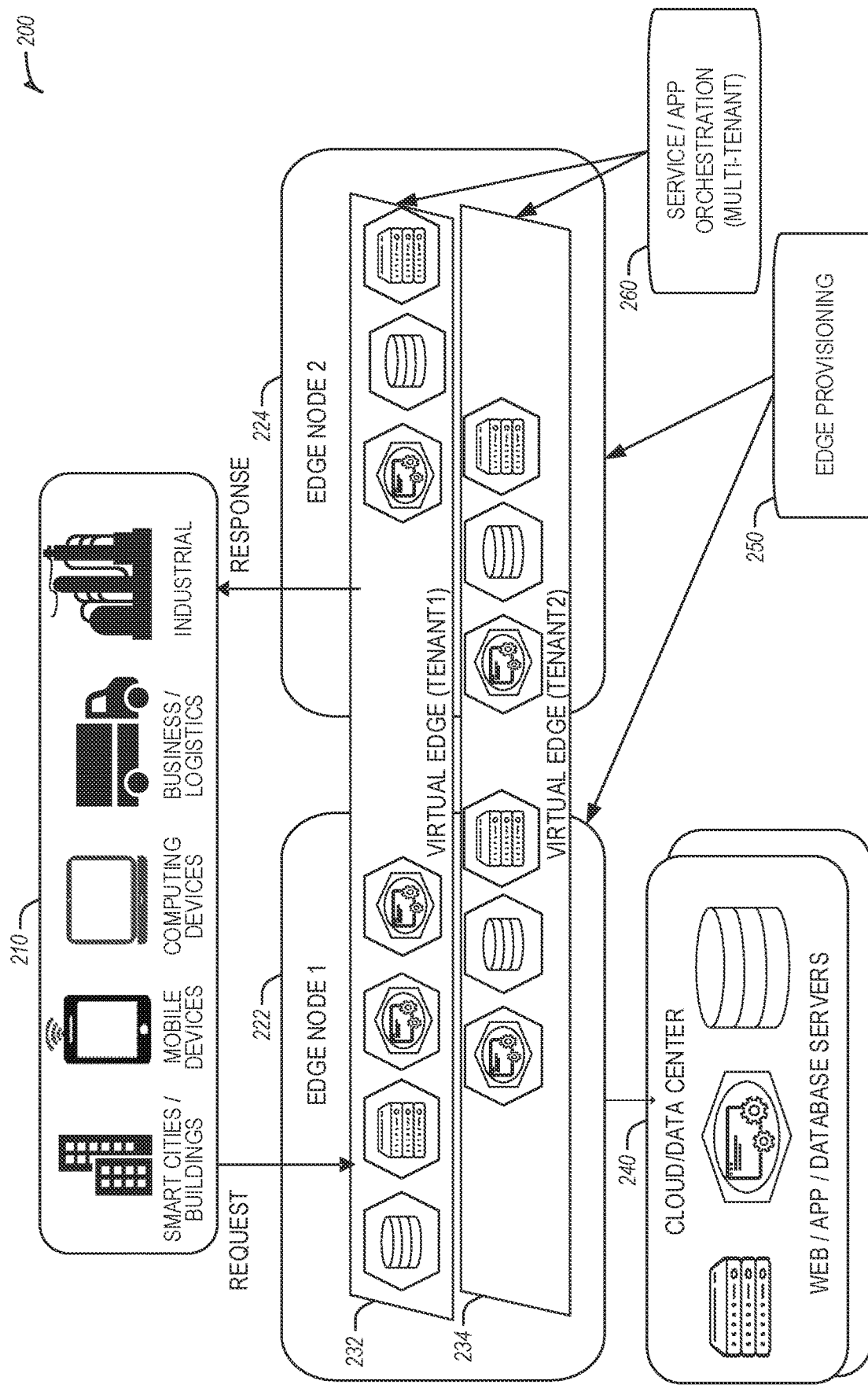
FIG. 2 illustrates deployment and orchestration for virtual edge configurations across an edge computing system operated among multiple edge nodes and multiple tenants, according to an example.

FIG. 2 illustrates deployment and orchestration for virtual edge configurations across an edge computing system operated among multiple edge nodes and multiple tenants. Specifically, FIG. 2 depicts coordination of a first edge node 222 and a second edge node 224 in an edge computing system 200, to fulfill requests and responses for various client endpoints 210 (e.g., smart cities/building systems, mobile devices, computing devices, business/logistics systems, industrial systems, etc.), which access various virtual edge instances. The virtual edge instances 232, 234 (or virtual edges) provide edge compute capabilities and processing in an edge cloud, with access to a cloud/data center 240 for higher-latency requests for websites, applications, database servers, etc. Thus, the edge cloud enables coordination of processing among multiple edge nodes for multiple tenants or entities.

In the example of FIG. 2, these virtual edge instances include: a first virtual edge 232, offered to a first tenant (Tenant 1), which offers a first combination of edge storage, computing, and services; and a second virtual edge 234, offering a second combination of edge storage, computing, and services, to a second tenant (Tenant 2). The virtual edge instances 232, 234 are distributed among the edge nodes 222, 224, and may include scenarios in which a request and response are fulfilled from the same or different edge nodes. The configuration of each edge node 222, 224 to operate in a distributed yet coordinated fashion occurs based on edge provisioning functions 250. The functionality of the edge nodes 222, 224 to provide coordinated operation for applications and services, among multiple tenants, occurs based on orchestration functions 260.

It should be understood that some of the devices in 210 are multi-tenant devices where Tenant1 may function within a Tenant1 'slice' while a Tenant2 may function within a Tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant-specific RoT. A RoT may further be computed dynamically composed using a security architecture, such as a DICE (Device Identity Composition Engine) architecture where a DICE hardware building block is used to construct layered trusted computing base contexts for secured and authenticated layering of device capabilities (such as with use of a Field Programmable Gate Array (FPGA)). The RoT also may be used for a trusted computing context to support respective tenant operations, etc. Use of this RoT and the security architecture may be enhanced by the attestation operations further discussed herein.

Edge computing nodes may partition resources (memory, central processing unit (CPU), graphics processing unit (GPU), interrupt controller, input/output (I/O) controller, memory controller, bus controller, etc.) where a respective partitioning may contain an RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective RoTs spanning devices in 210, 222, and 240 may coordinate the establishment of a distributed trusted computing base (DTCB) such that a tenant-specific virtual trusted secure channel linking all elements end to end can be established. Additionally, a DTCB may be used in a fan-in model where multiple roots of trust in a DICE layering may contribute UDS (Unique Device Secrets) to construct a composite UDS that describes a composite DTCB root of trust from which a traditional DICE layering of capabilities can be based.

Further, it will be understood that a container may have data or workload-specific keys protecting its content from a previous edge node. As part of the migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

For instance, the edge computing system may be extended to provide orchestration of multiple applications through the use of containers (a contained, deployable unit of software that provides code and needed dependencies), in a multi-owner, multi-tenant environment. A multi-tenant orchestrator may be used to perform key management, trust anchor management, and other security functions related to the provisioning and lifecycle of the trusted 'slice' concept in FIG. 2. An orchestrator may use a DICE layering and fan-out construction to create a root of trust context that is tenant-specific. Thus, orchestration functions, provided by an orchestrator, may participate as a tenant-specific orchestration provider.

Accordingly, an edge computing system may be configured to fulfill requests and responses for various client endpoints from multiple virtual edge instances (and, from a cloud or remote data center, not shown). The use of these virtual edge instances supports multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications, latency sensitive applications, latency critical applications, user plane applications, networking applications, etc.). The virtual edge instances may also be spanned across systems of multiple owners at different geographic locations (or, respective computing systems and resources which are co-owned or co-managed by multiple owners).

For instance, each edge node 222, 224 may implement the use of containers, such as with the use of a container "pod" 226, 228 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices of virtual edges 232, 234 are partitioned according to the needs of each container.

With the use of container pods, a pod controller oversees the partitioning and allocation of containers and resources. The pod controller receives instructions from an orchestrator (e.g., performing orchestration functions 260) that instructs the controller on how best to partition physical resources and for what duration, such as by receiving key performance indicator (KPI) targets based on SLA contracts. The pod controller determines which container requires which resources and for how long to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents the assignment of resources until the right tenant authenticates or prevents provisioning of data or a workload to a container until an attestation result is satisfied.

Also, with the use of container pods, tenant boundaries can still exist but in the context of each pod of containers. If each tenant-specific pod has a tenant-specific pod controller, there will be a shared pod controller that consolidates resource allocation requests to avoid typical resource starvation situations. Further controls may be provided to ensure the attestation and trustworthiness of the pod and pod controller. For instance, the orchestrator 260 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute, and a different shared pod controller is installed and invoked before the second pod executing.

In further examples, edge computing systems may deploy containers in an edge computing system. As a simplified example, a container manager is adapted to launch containerized pods, functions, and functions-as-a-service instances through execution via compute nodes, or to separately execute containerized virtualized network functions through execution via compute nodes. This arrangement may be adapted for use by multiple tenants in system arrangement, where containerized pods, functions, and functions-as-a-service instances are launched within virtual machines specific to each tenant (aside the execution of virtualized network functions).

Within the edge cloud, a first edge node 222 (e.g., operated by a first owner) and a second edge node 224 (e.g., operated by a second owner) may operate or respond to a container orchestrator to coordinate the execution of various applications within the virtual edge instances offered for respective tenants. For instance, the edge nodes 222, 224 may be coordinated based on edge provisioning functions 250, while the operation of the various applications are coordinated with orchestration functions 260.

Various system arrangements may provide an architecture that treats VMs, Containers, and Functions equally in terms of application composition (and resulting applications are combinations of these three ingredients). Each ingredient may involve use of one or more accelerator (e.g., FPGA, ASIC) components as a local backend. In this manner, applications can be split across multiple edge owners, coordinated by an orchestrator.

Figure 3:
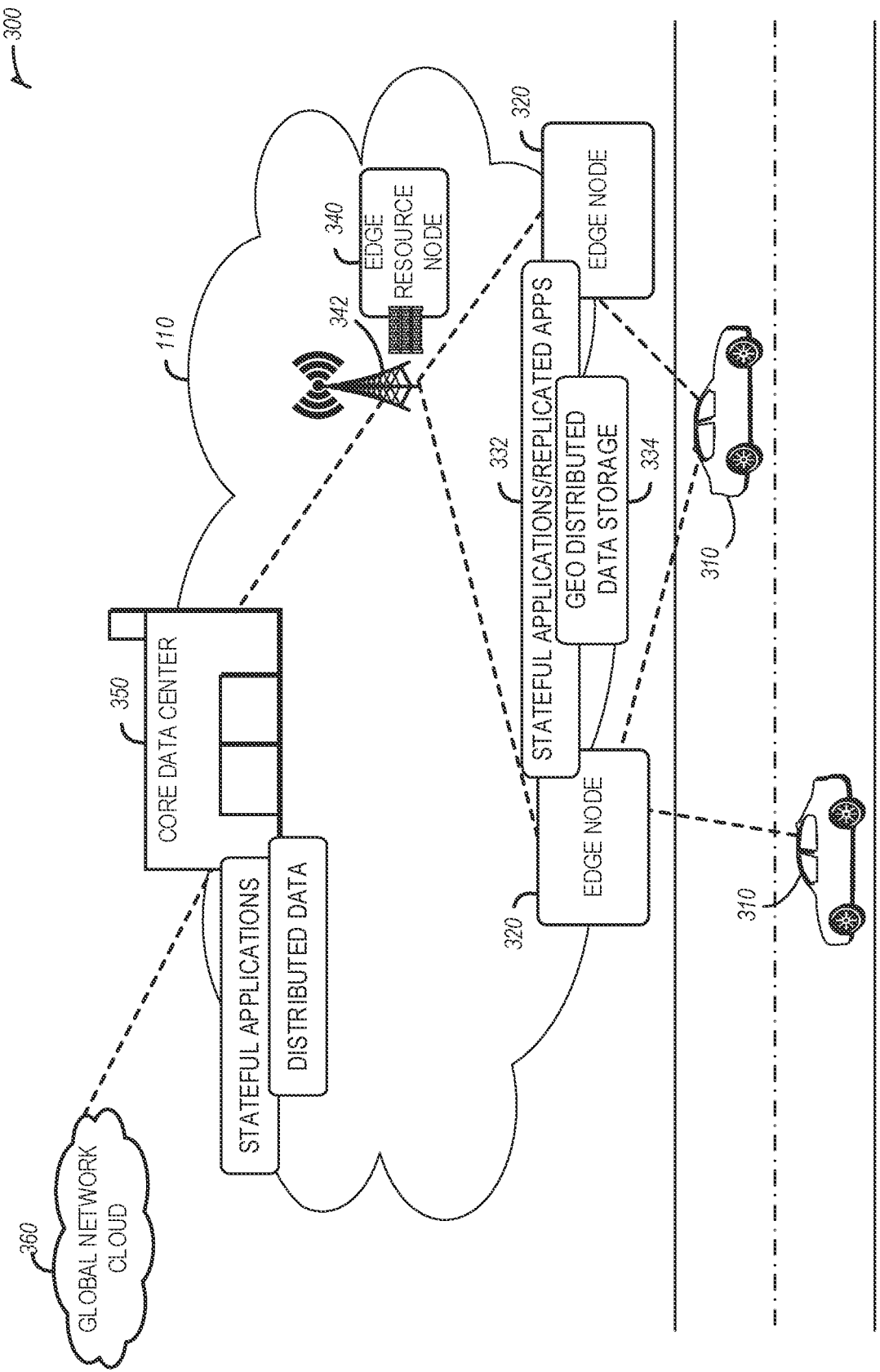
FIG. 3 illustrates a vehicle compute and communication use case involving mobile access to applications in an edge computing system, according to an example.

It should be appreciated that the edge computing systems and arrangements discussed herein may be applicable in various solutions, services, and/or use cases. As an example, FIG. 3 shows a simplified vehicle compute and communication use case involving mobile access to applications in an edge computing system 300 that implements an edge cloud 110. In this use case, each client compute node 310 may be embodied as in-vehicle compute systems (e.g., in-vehicle navigation and/or infotainment systems) located in corresponding vehicles that communicate with the edge gateway nodes 320 during traversal of a roadway. For instance, edge gateway nodes 320 may be located in roadside cabinets, which may be placed along the roadway, at intersections of the roadway, or other locations near the roadway. As each vehicle traverses along the roadway, the connection between its client compute node 310 and a particular edge gateway node 320 may propagate so as to maintain a consistent connection and context for the client compute node 310. Each of the edge gateway nodes 320 includes some processing and storage capabilities and, as such, some processing and/or storage of data for the client compute nodes 310 may be performed on one or more of the edge gateway nodes 320.

Each of the edge gateway nodes 320 may communicate with one or more edge resource nodes 340, which are illustratively embodied as compute servers, appliances or components located at or in a communication base station 342 (e.g., a base station of a cellular network). As discussed above, each edge resource node 340 includes some processing and storage capabilities and, as such, some processing and/or storage of data for the client compute nodes 310 may be performed on the edge resource node 340. For example, the processing of data that is less urgent or important may be performed by the edge resource node 340, while the processing of data that is of a higher urgency or importance may be performed by edge gateway devices or the client nodes themselves (depending on, for example, the capabilities of each component).

The edge resource node(s) 340 also communicate with the core data center 350, which may include compute servers, appliances, and/or other components located in a central location (e.g., a central office of a cellular communication network). The core data center 350 may provide a gateway to the global network cloud 360 (e.g., the Internet) for the edge cloud 110 operations formed by the edge resource node(s) 340 and the edge gateway nodes 320. Additionally, in some examples, the core data center 350 may include an amount of processing and storage capabilities and, as such, some processing and/or storage of data for the client compute devices may be performed on the core data center 350 (e.g., processing of low urgency or importance, or high complexity). The edge gateway nodes 320 or the edge resource nodes 340 may offer the use of stateful applications 332 and a geographic distributed data storage 334 (e.g., database, data store, etc.).

In further examples, FIG. 3 may utilize various types of mobile edge nodes, such as an edge node hosted in a vehicle (e.g., car, truck, tram, train, etc.) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in a variety of settings, including coordination between some functions or operations at individual endpoint devices or the edge gateway nodes 320, some others at the edge resource node 340, and others in the core data center 350 or global network cloud 360.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, the container is "spun down" (e.g., deactivated and/or deallocated) on the infrastructure in response to the execution being completed.

Further aspects of FaaS may enable deployment of edge functions in a service fashion, including a support of respective functions that support edge computing as a service. Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require deployment or configuration).

Example Internet of Things Architectures

Figure 4:
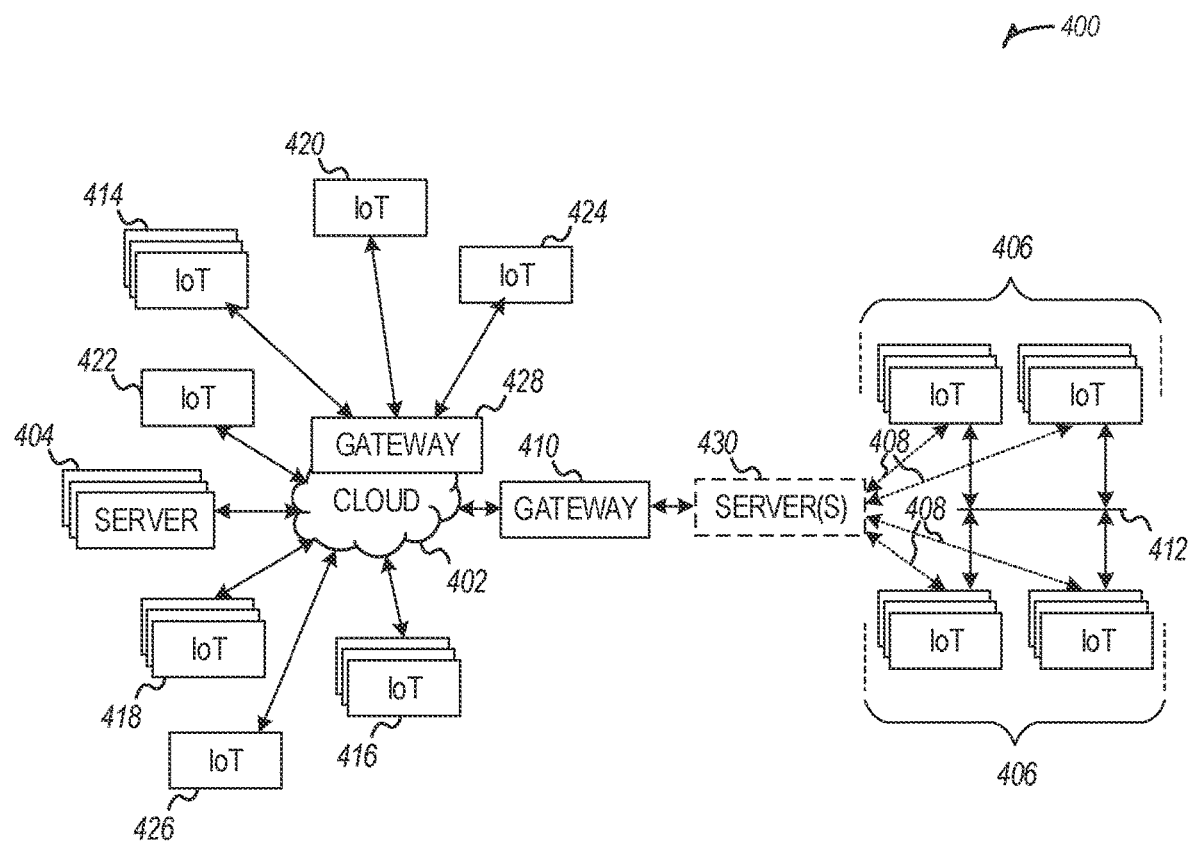
FIG. 4 illustrates a block diagram depicting deployment and communications among a number of Internet of Things (IoT) devices, according to an example.

As a more detailed illustration of an Internet of Things (IoT) network, FIG. 4 illustrates a drawing of a cloud or edge computing network, referred to as "cloud" 400, in communication with a number of IoT devices. The IoT is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Returning to FIG. 4, the cloud 400 may represent the Internet, or may be a local area network (LAN), or a wide area network (WAN), such as a proprietary network for a company. The IoT devices may include any number of different types of devices, grouped in various combinations. For example, a traffic control group 406 may include IoT devices along streets in a city. These IoT devices may include stoplights, traffic flow monitors, cameras, weather sensors, and the like. The traffic control group 406, or other subgroups, may be in communication with the cloud 400 through wired or wireless links 408, such as LPWA links, optical links, and the like. Further, a wired or wireless sub-network 412 may allow the IoT devices to communicate with each other, such as through a local area network, a wireless local area network, and the like. The IoT devices may use another device, such as a gateway 410 or 428 to communicate with remote locations such as the cloud 400; the IoT devices may also use one or more servers 430 to facilitate communication with the cloud 400 or with the gateway 410. For example, the one or more servers 430 may operate as an intermediate network node to support a local edge cloud or fog implementation among a local area network. Further, the gateway 428 that is depicted may operate in a cloud-to-gateway-to-many edge devices configuration, such as with the various IoT devices 414, 420, 424 being constrained or dynamic to an assignment and use of resources in the cloud 400.

Other example groups of IoT devices may include remote weather stations 414, local information terminals 416, alarm systems 418, automated teller machines 420, alarm panels 422, or moving vehicles, such as emergency vehicles 424 or other vehicles 426, among many others. Each of these IoT devices may be in communication with other IoT devices, with servers 404, with another IoT device or system, another edge computing or "fog" computing system, or a combination therein. The groups of IoT devices may be deployed in various residential, commercial, and industrial settings (including in both private or public environments).

As may be seen from FIG. 4, a large number of IoT devices may be communicating through the cloud 400. This may allow different IoT devices to request or provide information to other devices autonomously. For example, a group of IoT devices (e.g., the traffic control group 406) may request a current weather forecast from a group of remote weather stations 414, which may provide the forecast without human intervention. Further, an emergency vehicle 424 may be alerted by an automated teller machine 420 that a burglary is in progress. As the emergency vehicle 424 proceeds towards the automated teller machine 420, it may access the traffic control group 406 to request clearance to the location, for example, by lights turning red to block cross traffic at an intersection in sufficient time for the emergency vehicle 424 to have unimpeded access to the intersection.

Clusters of IoT devices may be equipped to communicate with other IoT devices as well as with a cloud network. This may allow the IoT devices to form an ad-hoc network between the devices, allowing them to function as a single device, which may be termed a fog device or system. Clusters of IoT devices, such as may be provided by the remote weather stations 414 or the traffic control group 406, may be equipped to communicate with other IoT devices as well as with the cloud 400. This may allow the IoT devices to form an ad-hoc network between the devices, allowing them to function as a single device, which also may be termed a fog device or system.

In further examples, a variety of topologies may be used for IoT networks comprising IoT devices, with the IoT networks coupled through backbone links to respective gateways. For example, a number of IoT devices may communicate with a gateway, and with each other through the gateway. The backbone links may include any number of wired or wireless technologies, including optical networks, and may be part of a local area network (LAN), a wide area network (WAN), or the Internet. Additionally, such communication links facilitate optical signal paths among both IoT devices and gateways, including the use of MUXing/de-MUXing components that facilitate interconnection of the various devices.

The network topology may include any number of types of IoT networks, such as a mesh network provided with the network using Bluetooth low energy (BLE) links. Other types of IoT networks that may be present include a wireless local area network (WLAN) network used to communicate with IoT devices through IEEE 802.11 (Wi-Fi®) links, a cellular network used to communicate with IoT devices through an LTE/LTE-A (4G) or 5G cellular network, and a low-power wide area (LPWA) network, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF).

Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources.

An IoT network, arranged as a mesh network, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

An IoT network, arranged as a WLAN network, for instance, may use systems that perform standards conversion to provide multi-standard connectivity, enabling IoT devices using different protocols to communicate. Further systems may provide seamless interconnectivity across a multi-standard infrastructure comprising visible Internet resources and hidden Internet resources.

An IoT network, using communications in the cellular network, for instance, may be enhanced by systems that offload data, extend communications to more remote devices, or both. A LPWA network may include systems that perform non-Internet protocol (IP) to IP interconnections, addressing, and routing. Further, each of the IoT devices may include the appropriate transceiver for wide area communications with that device. Further, each IoT device may include other transceivers for communications using additional protocols and frequencies.

In further examples, an edge or cloud computing network may be in communication with a mesh network of IoT devices at the edge of the cloud computing network. The mesh network of IoT devices may be termed a fog device or system, operating at the edge of the cloud. This fog device or system may be a massively interconnected network where a number of IoT devices are in communications with each other by radio links, for example. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Example Computing Devices

Figure 5:
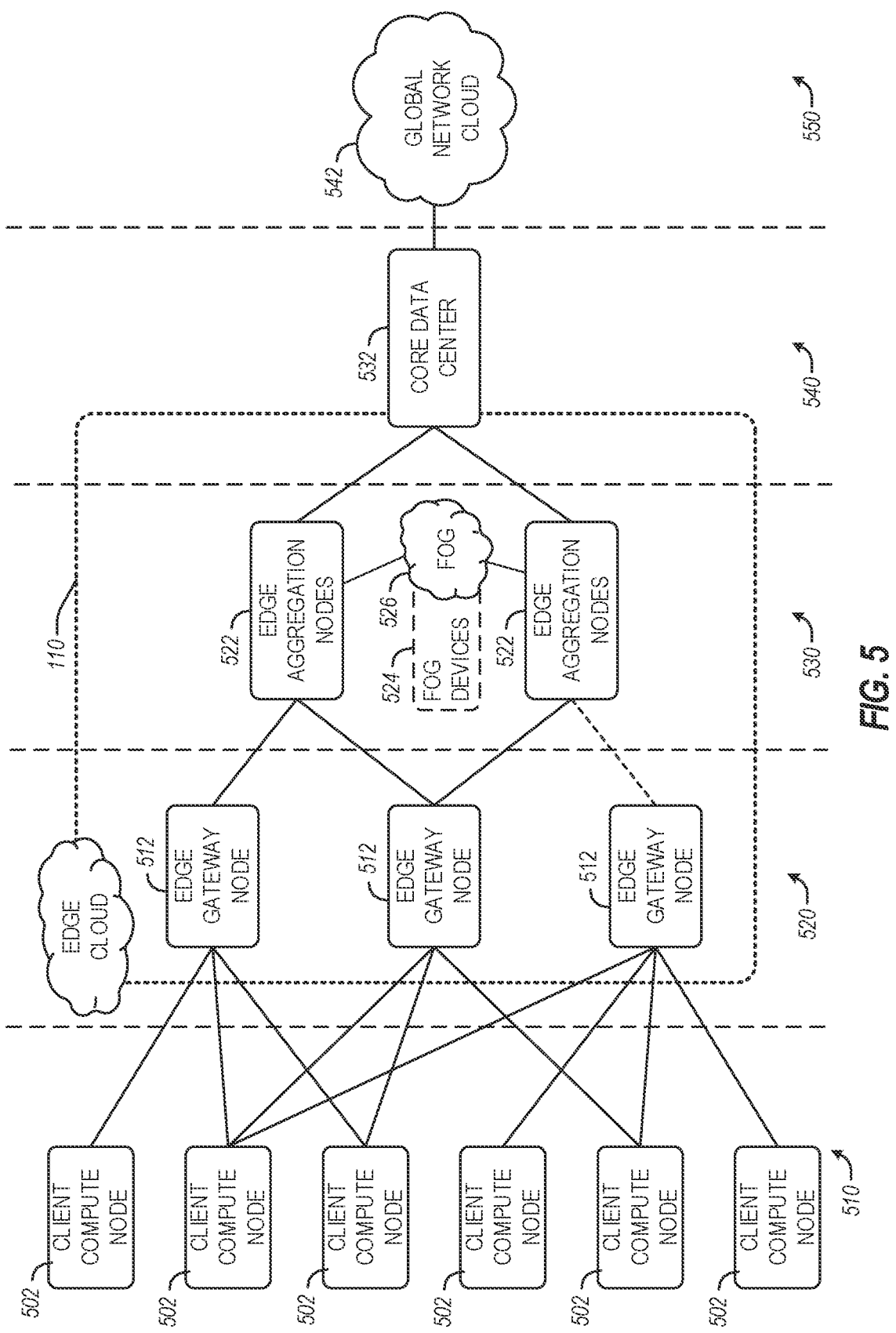
FIG. 5 illustrates an overview of layers of distributed compute deployed among an edge computing system, according to an example.

At a more generic level, an edge computing system may be described to encompass any number of deployments operating in the edge cloud 110, which provide coordination from client and distributed computing devices. FIG. 5 provides a further abstracted overview of layers of distributed compute deployed among an edge computing environment for purposes of illustration.

FIG. 5 generically depicts an edge computing system for providing edge services and applications to multi-stakeholder entities, as distributed among one or more client compute nodes 502, one or more edge gateway nodes 512, one or more edge aggregation nodes 522, one or more core data centers 532, and a global network cloud 542, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer corresponding to layers 510, 520, 530, 540, 550. For example, the client compute nodes 502 are each located at an endpoint layer 510, while each of the edge gateway nodes 512 are located at an edge devices layer 520 (local level) of the edge computing system. Additionally, each of the edge aggregation nodes 522 (and/or fog devices 524, if arranged or operated with or among a fog networking configuration 526) are located at a network access layer 530 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 532 is located at a core network layer 540 (e.g., a regional or geographically-central level), while the global network cloud 542 is located at a cloud data center layer 550 (e.g., a national or global layer). The use of "core" is provided as a term for a centralized network location-deeper in the network-which is accessible by multiple edge nodes or components; however, a "core" does not necessarily designate the "center" or the deepest location of the network. Accordingly, the core data center 532 may be located within, at, or near the edge cloud 110.

Although an illustrative number of client compute nodes 502, edge gateway nodes 512, edge aggregation nodes 522, core data centers 532, global network clouds 542 are shown in FIG. 5, it should be appreciated that the edge computing system may include more or fewer devices or systems at each layer. Additionally, as shown in FIG. 5, the number of components of each layer 510, 520, 530, 540, 550 generally increases at each lower level (i.e., when moving closer to endpoints). As such, one edge gateway node 512 may service multiple client compute nodes 502, and one edge aggregation node 522 may service multiple edge gateway nodes 512.

Consistent with the examples provided herein, each client compute node 502 may be embodied as any type of end point component, device, appliance, or "thing" capable of communicating as a producer or consumer of data. Further, the label "node" or "device" as used in the edge computing system 500 does not necessarily mean that such node or device operates in a client or agent/follower/minion role; rather, any of the nodes or devices in the edge computing system 500 refer to individual entities, nodes, or subsystems which include discrete or connected hardware or software configurations to facilitate or use the edge cloud 110.

As such, the edge cloud 110 is formed from network components and functional features operated by and within the edge gateway nodes 512 and the edge aggregation nodes 522 of layers 520, 530, respectively. The edge cloud 110 may be embodied as any type of network that provides edge computing and/or storage resources which are proximately located to radio access network (RAN) capable endpoint devices (e.g., mobile computing devices, IoT devices, smart devices, etc.), which are shown in FIG. 5 as the client compute nodes 502. In other words, the edge cloud 110 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 110 may form a portion of or otherwise provide an ingress point into or across a fog networking configuration 526 (e.g., a network of fog devices 524, not shown in detail), which may be embodied as a system-level horizontal and distributed architecture that distributes resources and services to perform a specific function. For instance, a coordinated and distributed network of fog devices 524 may perform computing, storage, control, or networking aspects in the context of an IoT system arrangement. Other networked, aggregated, and distributed functions may exist in the edge cloud 110 between the core data center layer 550 and the client endpoints (e.g., client compute nodes 502). Some of these are discussed in the following sections in the context of network functions or service virtualization, including the use of virtual edges and virtual services which are orchestrated for multiple stakeholders.

The edge gateway nodes 512 and the edge aggregation nodes 522 cooperate to provide various edge services and security to the client compute nodes 502. Furthermore, because each client compute node 502 may be stationary or mobile, each edge gateway node 512 may cooperate with other edge gateway devices to propagate presently provided edge services and security as the corresponding client compute node 502 moves about a region. To do so, each of the edge gateway nodes 512 and/or edge aggregation nodes 522 may support multiple tenancy and multiple stakeholder configurations, in which services from (or hosted for) multiple service providers and multiple consumers may be supported and coordinated across a single or multiple compute devices.

In various examples, the present techniques may be implemented in attestation or trust domains among the client compute nodes 502, at the edge gateway nodes 512 or aggregation nodes 522 (e.g., at a resource node which has a resource to be attested), and other intermediate nodes in the edge cloud 110 (e.g., which operate orchestrator functions, attestation service functions, etc.), as further discussed below with reference to the various configurations provided in FIGS. 7 to 15. Additionally, while reference to a delegated "verifier" entity is provided in many of the following examples, the verifier may also be located at various levels of the network 520, 530, 540.

In further examples, any of the compute nodes or devices discussed with reference to the present edge computing systems and environment may be fulfilled based on the components depicted in FIGS. 6A and 6B. Each edge compute node may be embodied as a type of device, appliance, computer, or other "thing" capable of communicating with other edge, networking, or endpoint components. For example, an edge compute device may be embodied as a personal computer, a server, smartphone, a mobile compute device, a smart appliance, an in-vehicle compute system (e.g., a navigation system), a self-contained device having an outer case, shell, etc., or other device or system capable of performing the described functions.

Figure 6A:
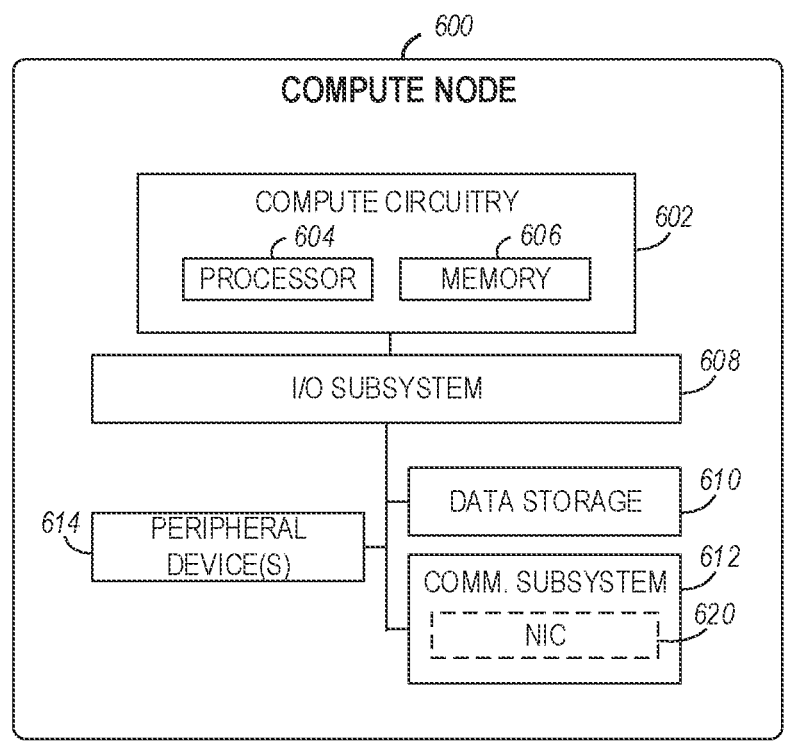
FIG. 6A illustrates an overview of example components deployed at a computing system deployed as a compute node, according to an example.

In the simplified example depicted in FIG. 6A, an edge compute node 600 includes a compute engine (also referred to herein as "compute circuitry") 602, an input/output (I/O) subsystem 608, data storage 610, a communication circuitry subsystem 612, and, optionally, one or more peripheral devices 614. In other examples, each compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 600 may be embodied as any type of engine, device, or collection of devices capable of performing various compute functions. In some examples, the compute node 600 may be embodied as a single device such as an integrated circuit, an embedded system, a field-programmable gate array (FPGA), a system-on-a-chip (SOC), or other integrated system or device. In the illustrative example, the compute node 600 includes or is embodied as a processor 604 and a memory 606. The processor 604 may be embodied as any type of processor capable of performing the functions described herein (e.g., executing an application). For example, the processor 604 may be embodied as a multi-core processor(s), a microcontroller, a processing unit, a specialized or special purpose processing unit, or other processor or processing/controlling circuit.

In some examples, the processor 604 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 604 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI or specialized hardware (e.g., GPUs, programmed FPGAs, Network Processing Units (NPUs), Infrastructure Processing Units (IPUs), Storage Processing Units (SPUs), AI Processors (APUs), Data Processing Unit (DPUs), or other specialized accelerators such as a cryptographic processing unit/accelerator). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that an xPU, a SOC, a CPU, and other variations of the processor 604 may work in coordination with each other to execute many types of operations and instructions within and on behalf of the compute node 600.

The memory 606 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three-dimensional crosspoint memory device (e.g., Intel 3D XPoint™ memory), or other byte addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 606 may be integrated into the processor 604. The main memory 606 may store various software and data used during operation such as one or more applications, data operated on by the application(s), libraries, and drivers.

The compute circuitry 602 is communicatively coupled to other components of the compute node 600 via the I/O subsystem 608, which may be embodied as circuitry and/or components to facilitate input/output operations with the compute circuitry 602 (e.g., with the processor 604 and/or the main memory 606) and other components of the compute circuitry 602. For example, the I/O subsystem 608 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 608 may form a portion of a system-on-a-chip (SoC) and be incorporated, along with one or more of the processor 604, the main memory 606, and other components of the compute circuitry 602, into the compute circuitry 602.

The one or more illustrative data storage devices 610 may be embodied as any type of devices configured for short-term or long-term storage of data such as, for example, memory devices and circuits, memory cards, hard disk drives, solid-state drives, or other data storage devices. Each data storage device 610 may include a system partition that stores data and firmware code for the data storage device 610. Each data storage device 610 may also include one or more operating system partitions that store data files and executables for operating systems depending on, for example, the type of compute node 600.

The communication circuitry 612 may be embodied as any communication circuit, device, or collection thereof, capable of enabling communications over a network between the compute circuitry 602 and another compute device (e.g., an edge gateway node 512 of the edge computing system 500). The communication circuitry 612 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol. Ethernet, Bluetooth®, Bluetooth Low Energy, an IoT protocol such as IEEE 802.15.4 or ZigBee®, low-power wide-area network (LPWAN) or low-power wide-area (LPWA) protocols, etc.) to effect such communication.

The illustrative communication circuitry 612 includes a network interface controller (NIC) 620, which may also be referred to as a host fabric interface (HFI). The NIC 620 may be embodied as one or more add-in-boards, daughter cards, network interface cards, controller chips, chipsets, or other devices that may be used by the compute node 600 to connect with another compute device (e.g., an edge gateway node 512). In some examples, the NIC 620 may be embodied as part of a system-on-a-chip (SoC) that includes one or more processors, or included on a multichip package that also contains one or more processors. In some examples, the NIC 620 may include a local processor (not shown) and/or a local memory (not shown) that are both local to the NIC 620. In such examples, the local processor of the NIC 620 may be capable of performing one or more of the functions of the compute circuitry 602 described herein. Additionally or alternatively, in such examples, the local memory of the NIC 620 may be integrated into one or more components of the client compute node at the board level, socket level, chip level, and/or other levels.

Additionally, in some examples, each compute node 600 may include one or more peripheral devices 614. Such peripheral devices 614 may include any type of peripheral device found in a compute device or server such as audio input devices, a display, other input/output devices, interface devices, and/or other peripheral devices, depending on the particular type of the compute node 600. In further examples, the compute node 600 may be embodied by a respective edge compute node in an edge computing system (e.g., client compute node 502, edge gateway node 512, edge aggregation node 522) or like forms of appliances, computers, subsystems, circuitry, or other components.

Figure 6B:
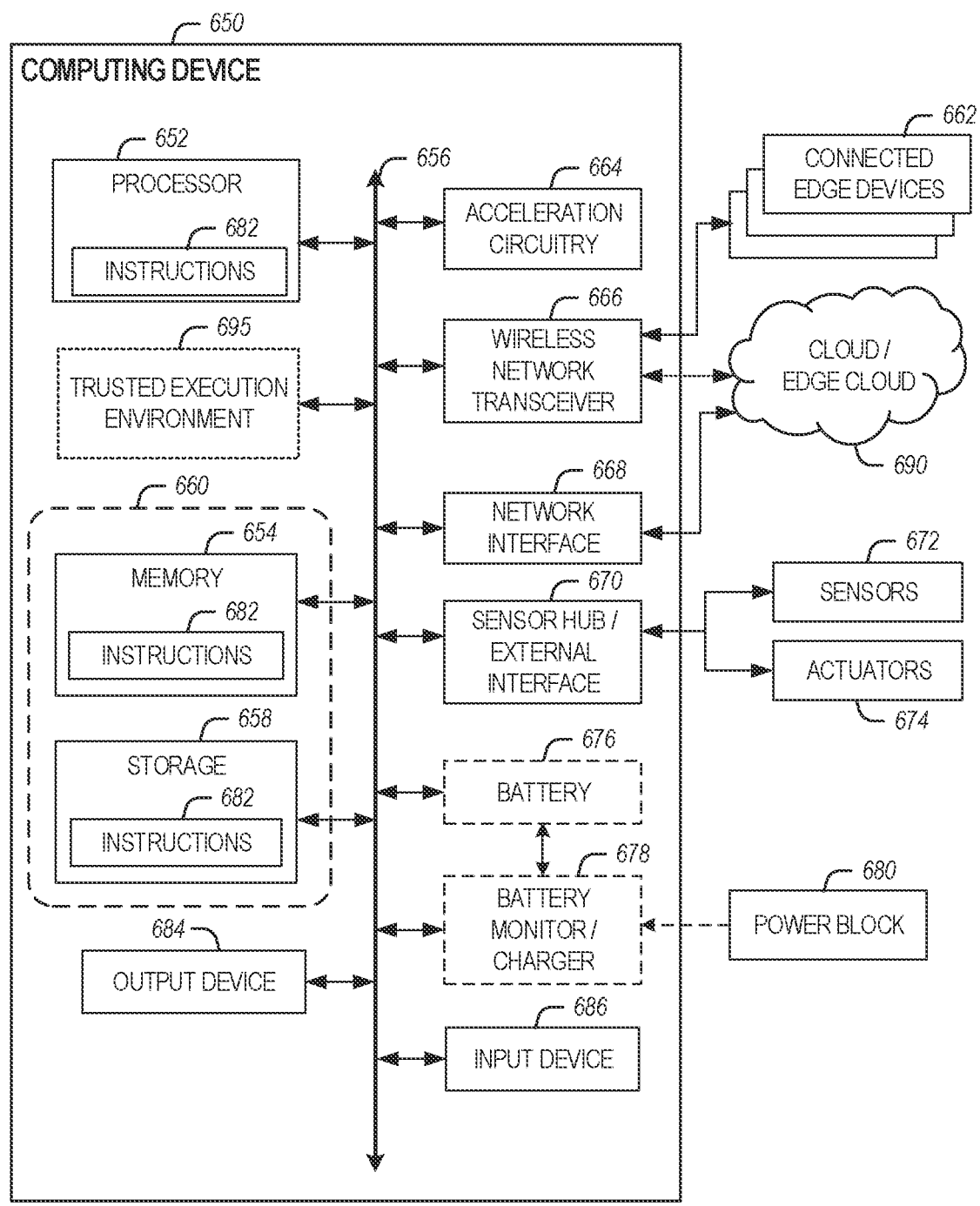
FIG. 6B illustrates a further overview of example components within a computing system deployed as a computing device, according to an example.

In a more detailed example, FIG. 6B illustrates a block diagram of an example of components that may be present in an edge computing node 650 for implementing the techniques (e.g., operations, processes, methods, and methodologies) described herein. This edge computing node 650 provides a closer view of the respective components of node 600 when implemented as or as part of a computing device (e.g., as a mobile device, a base station, server, gateway, etc.). The edge computing node 650 may include any combinations of the components referenced above, and it may include any device usable with an edge communication network or a combination of such networks. The components may be implemented as integrated circuits (ICs), portions thereof, discrete electronic devices, or other modules, logic, instruction sets, programmable logic or algorithms, hardware, hardware accelerators, software, firmware, or a combination thereof adapted in the edge computing node 650, or as components otherwise incorporated within a chassis of a larger system.

The edge computing node 650 may include processing circuitry in the form of a processor 652, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 652 may be a part of a system on a chip (SoC) in which the processor 652 and other components are formed into a single integrated circuit, or a single package, such as the Edison™ or Galileo™ SoC boards from Intel Corporation, Santa Clara, California. As an example, the processor 652 may include an Intel® Architecture Core™ based processor, such as a Quark™, an Atom™, an i3, an i5, an i7, an i9, or an MCU-class processor, or another such processor available from Intel®. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 652 and accompanying circuitry may be provided in a single socket form factor, multiple socket form factor, or a variety of other formats, including in limited hardware configurations or configurations that include fewer than all elements shown in FIG. 6B.

The processor 652 may communicate with a system memory 654 over an interconnect 656 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules. e.g., dual inline memory modules (DIMMs) of different varieties including but not limited to microDIMMs or MiniDIMMs.

To provide for persistent storage of information such as data, applications, operating systems and so forth, a storage 658 may also couple to the processor 652 via the interconnect 656. In an example, the storage 658 may be implemented via a solid-state disk drive (SSDD). Other devices that may be used for the storage 658 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 658 may be on-die memory or registers associated with the processor 652. However, in some examples, the storage 658 may be implemented using a micro hard disk drive (HDD). Further, any number of new technologies may be used for the storage 658 in addition to, or instead of, the technologies described, such resistance change memories, phase change memories, holographic memories, or chemical memories, among others.

The components may communicate over the interconnect 656. The interconnect 656 may include any number of technologies, including industry standard architecture (ISA), extended ISA (EISA), peripheral component interconnect (PCI), peripheral component interconnect extended (PCIx), PCI express (PCIe), or any number of other technologies. The interconnect 656 may be a proprietary bus, for example, used in an SoC based system. Other bus systems may be included, such as an I2C interface, an SPI interface, point to point interfaces, and a power bus, among others.

The interconnect 656 may couple the processor 652 to a transceiver 666, for communications with the connected edge devices 662. The transceiver 666 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 662. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 666 (or multiple transceivers) may communicate using multiple standards or radios for communications at a different range. For example, the edge computing node 650 may communicate with close devices, e.g., within about 10 meters, using a local transceiver based on BLE, or another low power radio, to save power. More distant connected edge devices 662, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 666 (e.g., a radio transceiver) may be included to communicate with devices or services in the edge cloud 690 via local or wide area network protocols. The wireless network transceiver 666 may be an LPWA transceiver that follows the IEEE 802.15.4, or IEEE 802.15.4g standards, among others. The edge computing node 650 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 666, as described herein. For example, the transceiver 666 may include a cellular transceiver that uses spread spectrum (SPA/SAS) communications for implementing high-speed communications. Further, any number of other protocols may be used, such as Wi-Fi® networks for medium speed communications and provision of network communications. The transceiver 666 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 668 may be included to provide a wired communication to nodes of the edge cloud 690 or to other devices, such as the connected edge devices 662 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 668 may be included to enable connecting to a second network, for example, a first NIC 668 providing communications to the cloud over Ethernet, and a second NIC 668 providing communications to other devices over another type of network.

Given the variety of types of applicable communications from the device to another component or network, applicable communications circuitry used by the device may include or be embodied by any one or more of components 664, 666, 668, or 670. Accordingly, in various examples, applicable means for communicating (e.g., receiving, transmitting, etc.) may be embodied by such communications circuitry.

The edge computing node 650 may include or be coupled to acceleration circuitry 664, which may be embodied by one or more AI accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 656 may couple the processor 652 to a sensor hub or external interface 670 that is used to connect additional devices or subsystems. The devices may include sensors 672, such as accelerometers, level sensors, flow sensors, optical light sensors, camera sensors, temperature sensors, a global navigation system (e.g., GPS) sensors, pressure sensors, barometric pressure sensors, and the like. The hub or interface 670 further may be used to connect the edge computing node 650 to actuators 674, such as power switches, valve actuators, an audible sound generator, a visual warning device, and the like.

In some optional examples, various input/output (I/O) devices may be present within or connected to, the edge computing node 650. For example, a display or other output device 684 may be included to show information, such as sensor readings or actuator position. An input device 686, such as a touch screen or keypad may be included to accept input. An output device 684 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 650. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 676 may power the edge computing node 650, although, in examples in which the edge computing node 650 is mounted in a fixed location, it may have a power supply coupled to an electrical grid, or the battery may be used as a backup or for temporary capabilities. The battery 676 may be a lithium ion battery, or a metal-air battery, such as a zinc-air battery, an aluminum-air battery, a lithium-air battery, and the like.

A battery monitor/charger 678 may be included in the edge computing node 650 to track the state of charge (SoCh) of the battery 676. The battery monitor/charger 678 may be used to monitor other parameters of the battery 676 to provide failure predictions, such as the state of health (SoH) and the state of function (SoF) of the battery 676. The battery monitor/charger 678 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 678 may communicate the information on the battery 676 to the processor 652 over the interconnect 656. The battery monitor/charger 678 may also include an analog-to-digital (ADC) converter that enables the processor 652 to directly monitor the voltage of the battery 676 or the current flow from the battery 676. The battery parameters may be used to determine actions that the edge computing node 650 may perform, such as transmission frequency, mesh network operation, sensing frequency, and the like.

A power block 680, or other power supply coupled to a grid, may be coupled with the battery monitor/charger 678 to charge the battery 676. In some examples, the power block 680 may be replaced with a wireless power receiver to obtain the power wirelessly, for example, through a loop antenna in the edge computing node 650. A wireless battery charging circuit, such as an LTC4020 chip from Linear Technologies of Milpitas, California, among others, may be included in the battery monitor/charger 678. The specific charging circuits may be selected based on the size of the battery 676, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 658 may include instructions 682 in the form of software, firmware, or hardware commands to implement the techniques described herein. Although such instructions 682 are shown as code blocks included in the memory 654 and the storage 658, it may be understood that any of the code blocks may be replaced with hardwired circuits, for example, built into an application specific integrated circuit (ASIC).

Also in a specific example, the instructions 682 on the processor 652 (separately, or in combination with the instructions 682 of the machine readable medium 660) may configure execution or operation of a trusted execution environment (TEE) 695. In an example, the TEE 695 operates as a protected area accessible to the processor 652 for secure execution of instructions and secure access to data. Various implementations of the TEE 695, and an accompanying secure area in the processor 652 or the memory 654 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the node 650 through the TEE 695 and the processor 652.

In an example, the instructions 682 provided via the memory 654, the storage 658, or the processor 652 may be embodied as a non-transitory, machine-readable medium 660 including code to direct the processor 652 to perform electronic operations in the edge computing node 650. The processor 652 may access the non-transitory, machine-readable medium 660 over the interconnect 656. For instance, the non-transitory, machine-readable medium 660 may be embodied by devices described for the storage 658 or may include specific storage units such as optical disks, flash drives, or any number of other hardware devices. The non-transitory, machine-readable medium 660 may include instructions to direct the processor 652 to perform a specific sequence or flow of actions, for example, as described with respect to the flowchart(s) and block diagram(s) of operations and functionality depicted above. As used herein, the terms "machine-readable medium", "computer-readable medium", "machine-readable storage", and "computer-readable storage" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks: and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 6C:
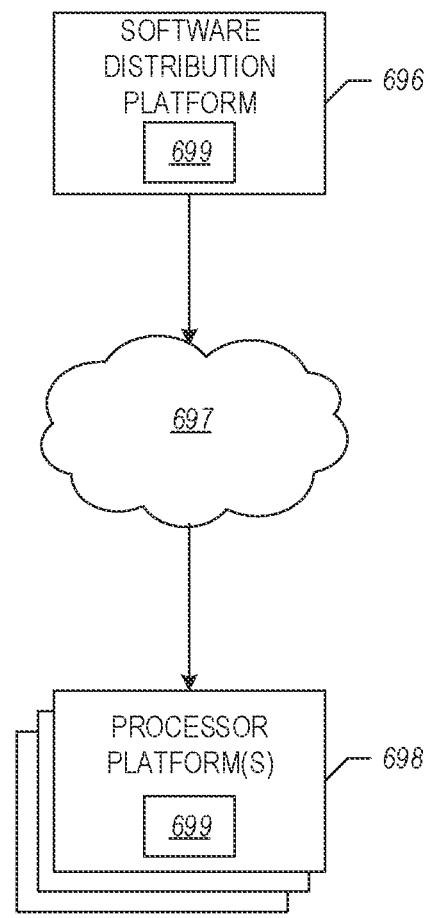
FIG. 6C illustrates a software distribution platform provided among computing systems, according to an example.

FIG. 6C illustrates an example software distribution platform 696 to distribute software, such as example computer-readable instructions 699, to one or more devices, such as processor platform(s) 698 and/or example connected edge devices 662 of FIG. 6B. The example software distribution platform 696 may be implemented by any computer server, data facility, cloud service, etc., capable of storing and transmitting software to other computing devices (e.g., third parties, the example connected edge devices 662 of FIG. 6B). Example connected edge devices may be customers, clients, managing devices (e.g., servers), third parties (e.g., customers of an entity owning and/or operating the software distribution platform 696). Example connected edge devices may operate in commercial and/or home automation environments. In some examples, a third party is a developer, a seller, and/or a licensor of software such as the example computer-readable instructions 682. The third parties may be consumers, users, retailers, OEMs, etc. that purchase and/or license the software for use and/or re-sale and/or sub-licensing. In some examples, distributed software causes the display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 6C, the software distribution platform 696 includes one or more servers and one or more storage devices. The storage devices store the computer-readable instructions 699, which may correspond to the example computer-readable instructions 682 of FIG. 6B, as described above. The one or more servers of the example software distribution platform 696 are in communication with a network 697, which may correspond to any one or more of the Internet and/or any of the example networks described herein. In some examples, the one or more servers are responsive to requests to transmit the software to a requesting party as part of a commercial transaction. Payment for the delivery, sale, and/or license of the software may be handled by the one or more servers of the software distribution platform and/or via a third-party payment entity. The servers enable purchasers and/or licensors to download the computer-readable instructions 699 from the software distribution platform 696. For example, the software, which may correspond to the example computer-readable instructions 682 of FIG. 6B, may be downloaded to the example processor platform(s) 698 (e.g., example connected edge devices), which is/are to execute the computer-readable instructions 699 to implement the techniques discussed herein. In some examples, one or more servers of the software distribution platform 696 are communicatively connected to one or more security domains and/or security devices through which requests and transmissions of the example computer-readable instructions 699 must pass. In some examples, one or more servers of the software distribution platform 696 periodically offer, transmit, and/or force updates to the software (e.g., the example computer-readable instructions 682 of FIG. 6B which can be the same as the computer-readable instructions 699) to ensure improvements, patches, updates, etc. are distributed and applied to the software at the end-user devices.

In the illustrated example of FIG. 6C, the computer-readable instructions 699 are stored on storage devices of the software distribution platform 696 in a particular format. A format of computer-readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer-readable instructions 699 stored in the software distribution platform 696 are in a first format when transmitted to the example processor platform(s) 696. In some examples, the first format is an executable binary in which particular types of the processor platform(s) 698 can execute. However, in some examples, the first format is uncompiled code that requires one or more preparation tasks to transform the first format to a second format to enable execution on the example processor platform(s) 698. For instance, the receiving processor platform(s) 698 may need to compile the computer-readable instructions 699 in the first format to generate executable code in a second format that is capable of being executed on the processor platform(s) 698. In still other examples, the first format is interpreted code that, upon reaching the processor platform(s) 698, is interpreted by an interpreter to facilitate execution of instructions.

Each of the block diagrams of FIGS. 6A to 6C are intended to depict a high-level view of components of a device, subsystem, or arrangement of an edge computing node and system. However, it will be understood that some of the components shown may be omitted, additional components may be present, and a different arrangement of the components shown may occur in other implementations.

Attestation Verifier Role Delegation

In the context of a deployed device (such as the edge computing nodes(s) or device(s) depicted in FIG. 5) the present techniques and configurations provide a framework for distributed attestation functions, and the delegation of a verifier role for attestation.

Component authentication via attestation is a typical method to validate the legitimacy of an entity in a platform that requires strict enforcement of a proof of identity. In an attestation model, the verifier sends a challenge to the attestor and receives a certificate chain, or collection of certificates, from the attestor in response. The attestor calculates the response with unique crypto secret (usually derived by a private key or an alias key) then sends the response back to the verifier.

Attestation-verification is widely used in trusted computing environments to establish the credibility and believability of the attesting environment. For example, Intel® SGX, SPDM (Security Protocol and Data Model) by DMTF, DICE (Device Identity Composition Engine) by TCG, and TPM technology each implement attestation mechanisms.

Typically in the attestation model, the verifier is either a centralized entity (such as a cloud service) or an edge orchestrator that is responsible for the attestation of downstream entities. Attesters may also be statically distributed in various layers of an Edge or IoT network where each downstream node is responsible for the attestation of other downstream entities.

Figure 7:
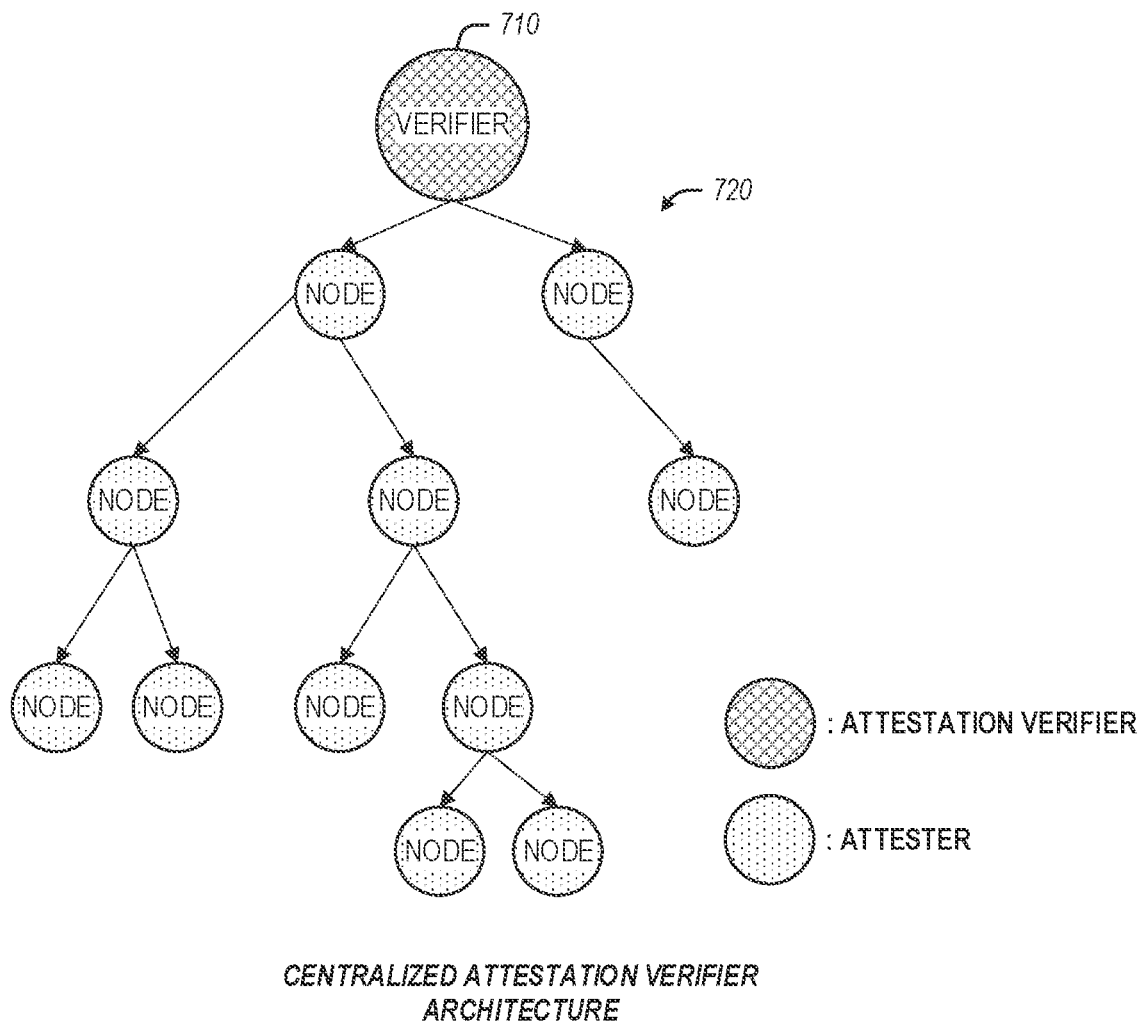
FIG. 7 depicts an attestation model showing downstream entities in an edge computing network, according to an example.

As an example, FIG. 7 depicts a centralized attestation verifier architecture, where an attestation verifier 710 distributes information to a variety of attester nodes 720. However, use of a centralized attestation verifier architecture provides scalability challenges, related to two disadvantages.

First, the workload of the centralized verifier 710 performing attestation has a cascaded backlog behavior as the number of nodes 720 in the network is increased. The backlog causes delays or timeouts as more downstream nodes are provisioned into the network. This is especially critical in IoT and edge computing where many nodes may enter (and leave) the network frequently.

Second, the centralized verifier model also poses a privacy threat. The use of a centralized verifier 710 may lead to the extraction of privacy sensitive customer data, including graph data indicating the density distribution maps of various customer workloads and device specific information available from the collected attestation evidence.

The following proposes a mechanism to distribute the verifier function into downstream entities by assigning the verifier role to other entities in the network. This mechanism recursively applies the attestation process as a way to evaluate trust in alternative nodes prior to assigning the verifier role. Additionally, the new verifier may be made subject to periodical re-attestations and audits by its peers and by its endorser/manufacturer.

In contrast to the following distributed verifier mechanism, conventional attestation and security approaches encounter scalability or privacy issues. For instance, network orchestrators, routers or other network control operations nodes do not know how to provision a local verifier of a complex device and grant authorization to function as a verifier (with appropriate constraints to service only local attesters). Additionally, complex device architectures including those with multiple roots of trust on the same device do not have a mechanism for delegating a verifier role to DICE layers or sub-components of a complex device.

Figure 8:
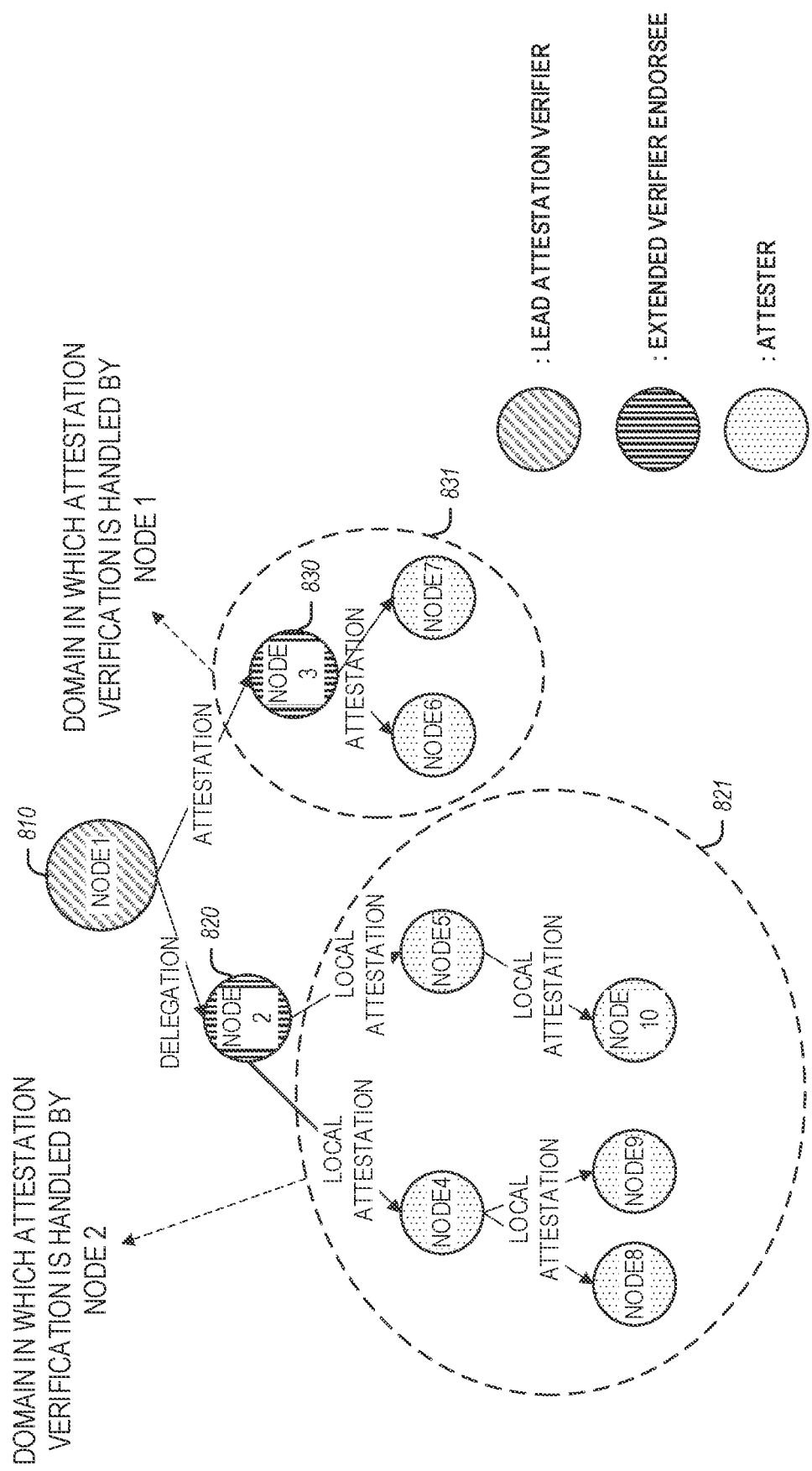
FIG. 8 depicts attestation domain isolation with verifier delegation, according to an example.

FIG. 8 depicts a system diagram of a distributed attestation verifier configuration. The system may include multiple nodes in a network or distributed system such as a Cloud, Edge, IoT or Enterprise network. In this diagram, Node 1 810 serves the role of lead attestation verifier. With a verifier delegation method, Node 1 810 may dynamically attest and appraise another node, and delegate the verifier role to Node 2 820, for example. Node 2 820 will handle local attestation workloads for its downstream nodes (in domain 821) using an appraisal policy conveyed by the lead attestation verifier 810. Local attestation under Node 2 820 (within domain 821) then is hidden from the lead attestation verifier 810 to reduce the burden of the lead attestation verifier 810; likewise, local attestation under Node 3 830 (within domain 831) is hidden from the lead attestation verifier 810.

Attestation functionality and the roles of an attester, endorser, verifier, verifier owner, relying party, among different attestation scenarios is generally depicted in FIGS. 9A to 9E. An attestation architecture includes multiple roles, and each cooperates in the performance of different roles in order to achieve attestation results that informs a relying party (such as an application or other network node) of the security risk assessment outcome.

Figure 9A:
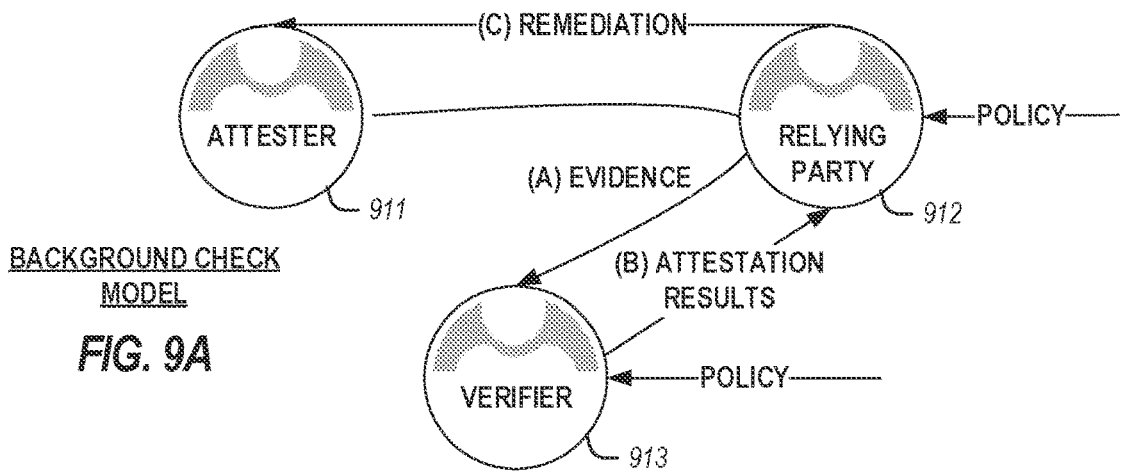
FIGS. 9A to 9E depicts aspects of an attestation roles architecture, according to an example.

FIG. 9A provides an illustration of a background check model for attestation, where an attester 911 provides attestation evidence to a verifier 913 via a relying party 912 (operation (A)). The verifier 913 provides the attestation results to the relying party 912 (operation (B)), who then performs remediation with the attester 911 (operation (C)).

Figure 9B:
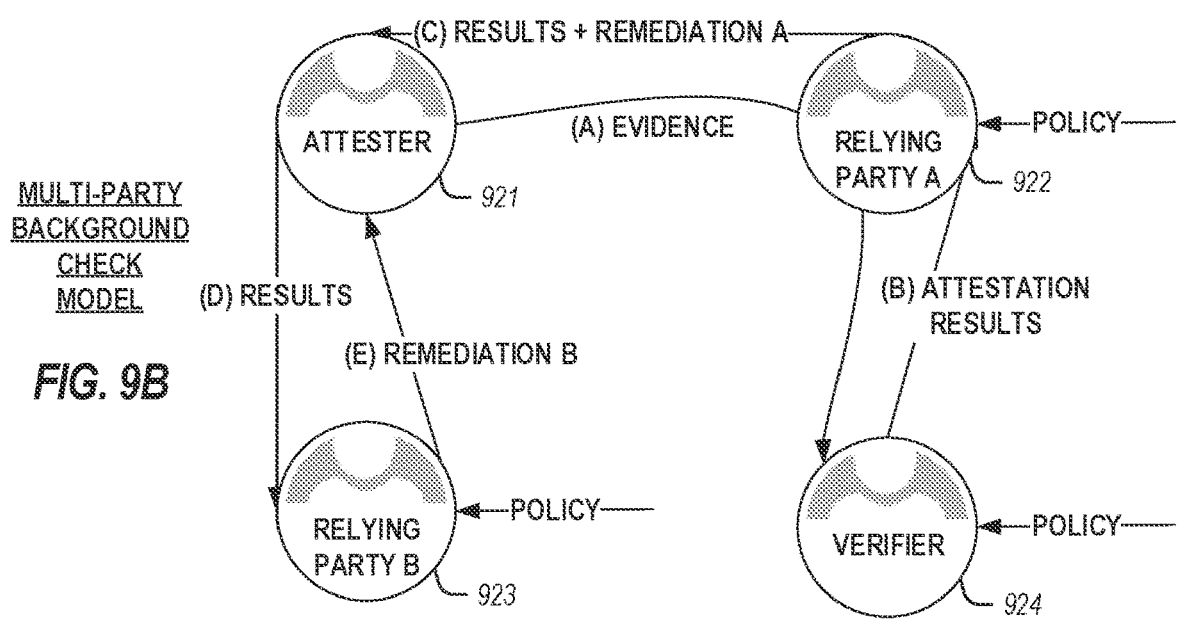

FIG. 9B provides an illustration of a multi-party background check model for attestation, where an attester 921 provides evidence to a relying party 922 (operation (A)) who then communicates the evidence to a verifier 924 (operation (A)). The verifier 924 provides the attestation results to the relying party 922 (operation (B)) who then provides the attestation results and performs a first remediation with the attester 921 (operation (C)). Additionally, the attester 921 provides the attestation results to a relying party 923 (operation (D)) who also performs a second remediation with the attester 921 (operation (E)).

Figure 9C:
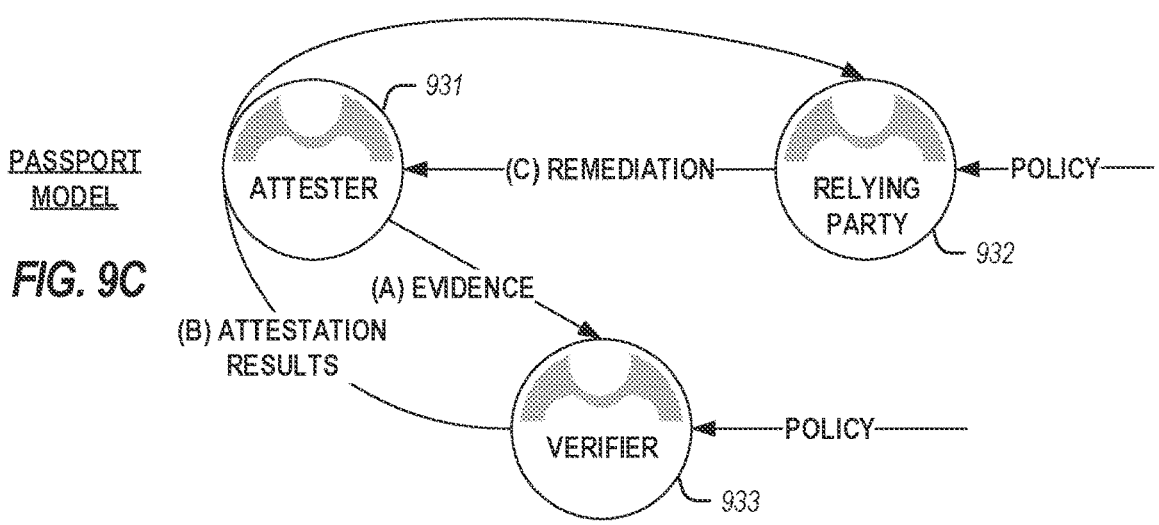

FIG. 9C provides an illustration of a passport model for attestation, where an attester 931 provides evidence to a verifier 933 (operation (A)) who then communicates attestation results to a relying party 932 (operation (B)). The relying party 932 then performs a remediation with the attester 931 (operation (C)).

Figure 9D:
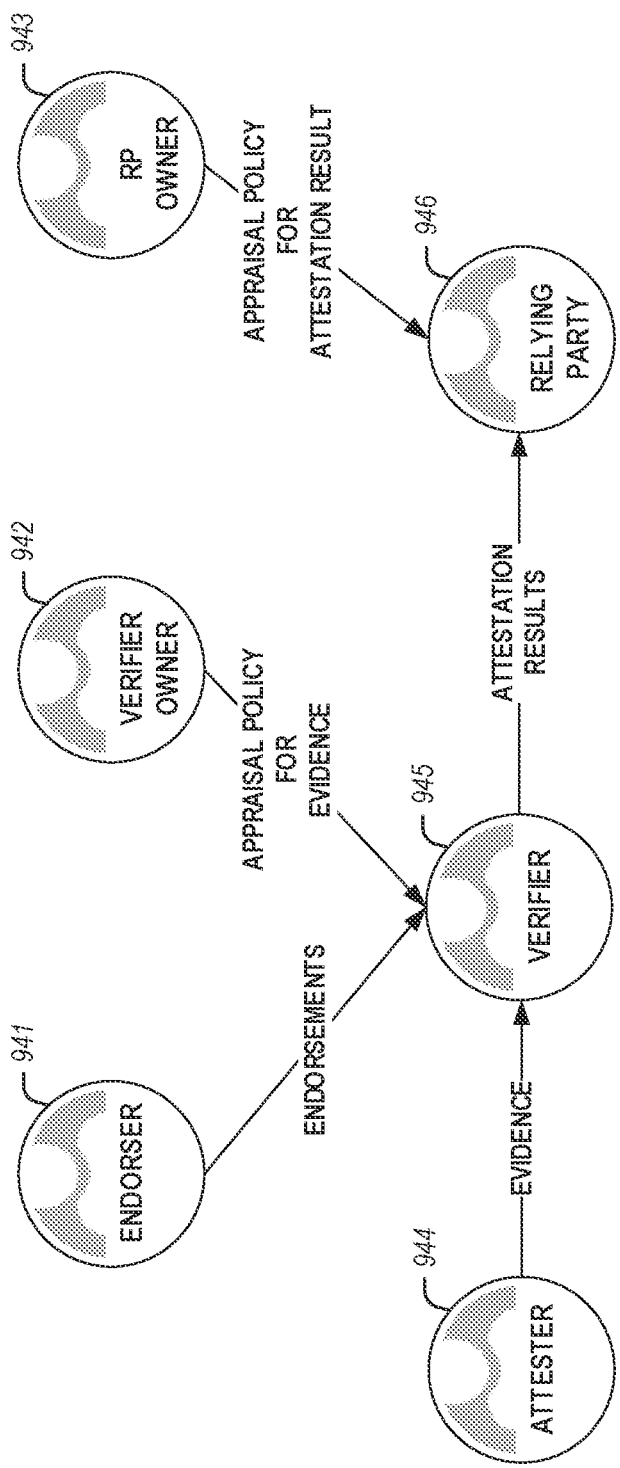
Figure 9E:
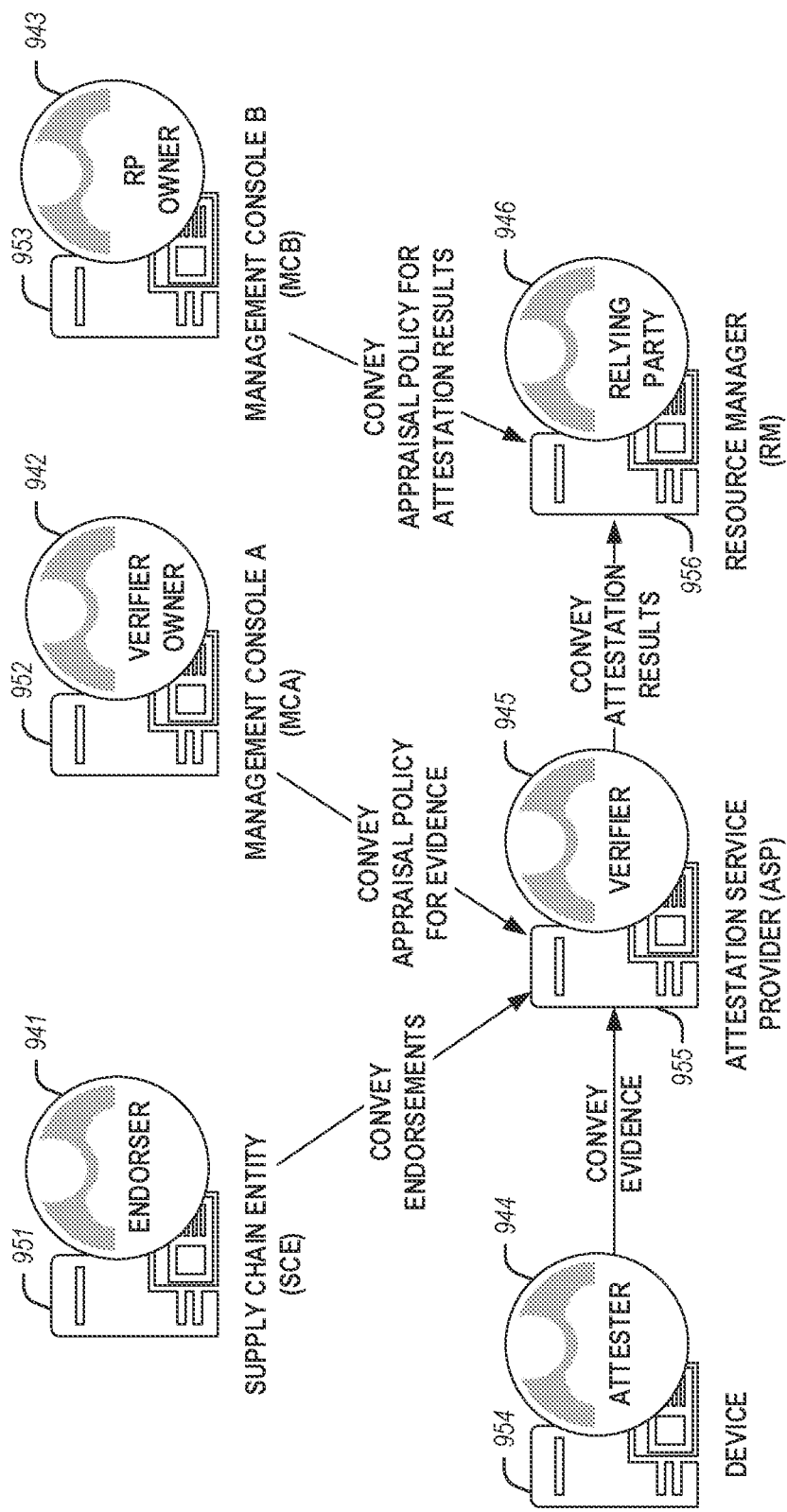

FIG. 9D provides an illustration of an endorser-owner model for attestation, and FIG. 9E provides an illustration of use of the endorser-owner model among a set of computer systems. Specifically, these drawings demonstrate how an endorser 941 (e.g., a supply chain entity 951) conveys endorsements (e.g., endorsement information or endorsement data provided via structured data), and a verifier owner 942 (e.g., a management console 952) conveys an appraisal policy (e.g., a data structure or similar defined representation of appraisal characteristics) for evidence to a verifier 945 (e.g., an attestation service provider 955). The attester 944 (e.g., device 954) conveys evidence to the verifier 945 for evaluation according to this appraisal policy and endorsements.

The verifier 945 conveys attestation results to a relying party 946 (e.g., a resource manager 956), and a relying party owner 943 (e.g., a management console 953) conveys an appraisal policy for the attestation results to the relying party 946. Accordingly, the relying party 946 may perform an evaluation of the attestation results consistent with the attestation policy.

The verifier role in these and other attestation models is the subject of the following techniques. As will be understood, the verifier may need to address multiple functions or sub-functions of attestation procedures that each present scalability challenges. One function is encoding and decoding of the various attestation message types (e.g. evidence, endorsements, attestation results and policies, exchanged with various data messages) communicated in these and other attestation scenarios. Such attestation data or information associated with attestation operations may be defined according to a variety of computer readable formats, and may be subject to validation or verification, changes or transformations, etc. With the following attestation delegation approaches, scaling up and scaling down of attestation operations on a network may be feasible and provide a variety of technical advantages.

Figure 10:
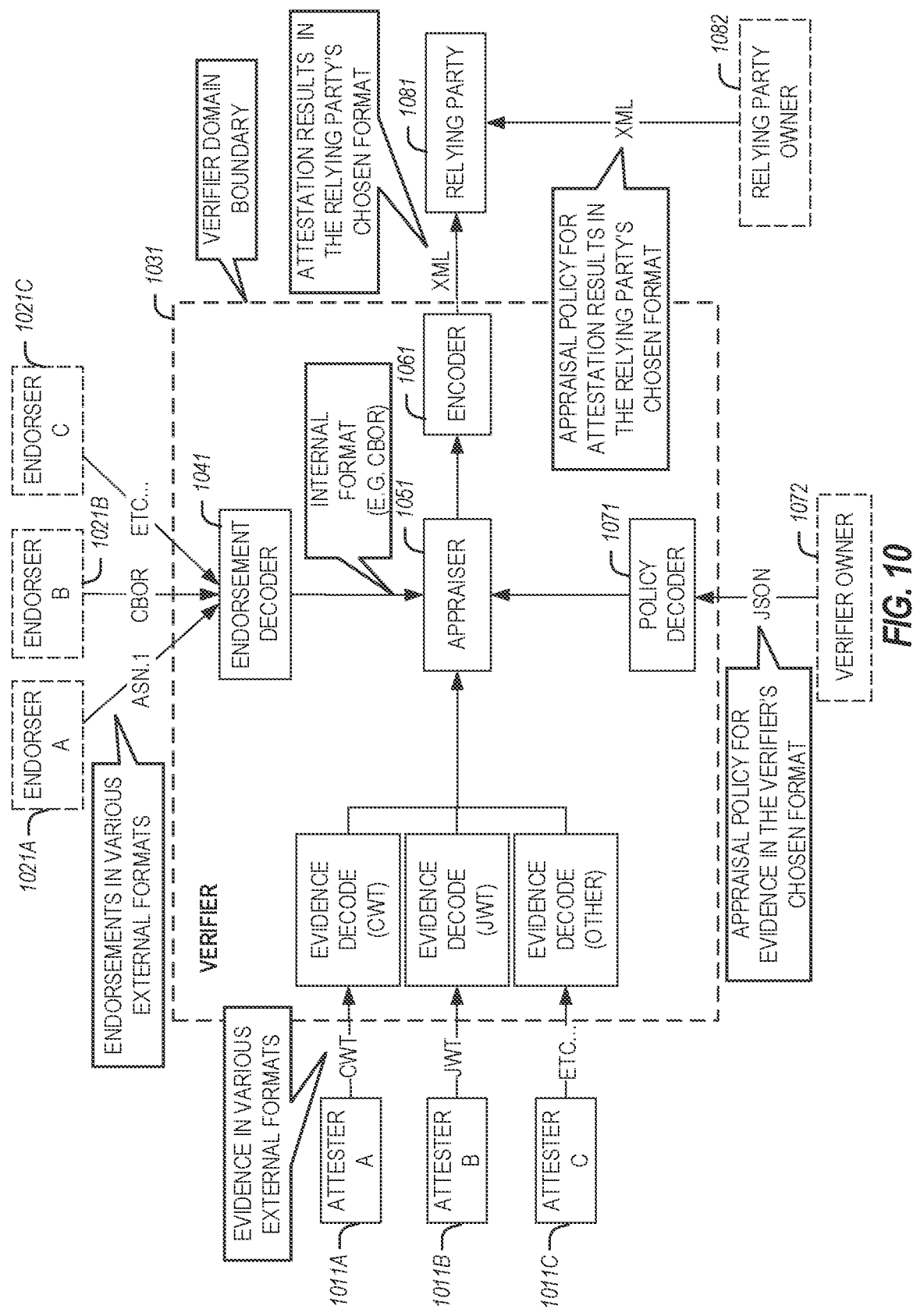
FIG. 10 depicts an attestation process among verifier nodes, according to an example.

FIG. 10 depicts a set of attesters 1011 (1011A-1011C), endorsers 1021 (1021A-1021C), and owners (verifier owner 1072, relying party owner 1082) that may supply messages (e.g., communications with a defined structure) having a plurality of encoding formats and data models, for use with a verifier architecture. In particular, this diagram demonstrates how the verifier architecture may partition the encoding and decoding functions so that multiple encoding formats and data structure definitions can be supported by a single verifier node 1031, which provides attestation results to a relying party 1081. Although separate entities are depicted in FIG. 10 and accompanying figures, it will be understood that the verifier architecture may be provided by respective compute nodes, compute circuitry, compute components, compute devices, or compute entities, within the same, different, or distributed system arrangements.

FIG. 10 further shows the internal componentry of the single verifier node 1031. Verifiers may interact with a variety of different attestation systems where related information are encoded differently according to the design of the supported applications and standards. As a result, various encode/decode functions are needed. FIG. 10 specifically depicts a few example encodings (CBOR Web Token (CWT), JSON Web Token (JWT), etc.) used by decoders (including decoders 1041, 1071 and encoder 1061) but other encodings are possible.

Within the verifier node 1031 is an appraiser function 1051 that evaluates the evidence and endorsements to arrive at an attestation result. The appraisal function may consist of building an internal representation of evidence where various subcomponents of an attested device (described in more detail with reference to FIG. 12, below) may be represented in evidence and in endorsements.

Even in this context, a verifier node 1031 may have limited resources for supporting many different message encoding formats. Consequently, a network operator may deploy multiple verifier nodes to load balance based on a partitioning of encoding formats. For example, Verifier A may handle JWT encoded messages, while Verifier B may handle CWT encoded messages.

Verifier scalability is also impacted by functionality of the appraiser 1051. Appraiser function offload may be another method justifying delegation of an attestation verifier. Accordingly, in an example, a delegate verifier is created that accepts a portion of the appraisal workload. This may be enhanced by an internal representation of attestation information, for example Concise Binary Object Representation (CBOR), that is common among all internal verifier functions. Additionally, it is common across delegate verifiers so as to minimize encode/decode overhead while still supporting data serialization and protection across a network.

Figure 11:
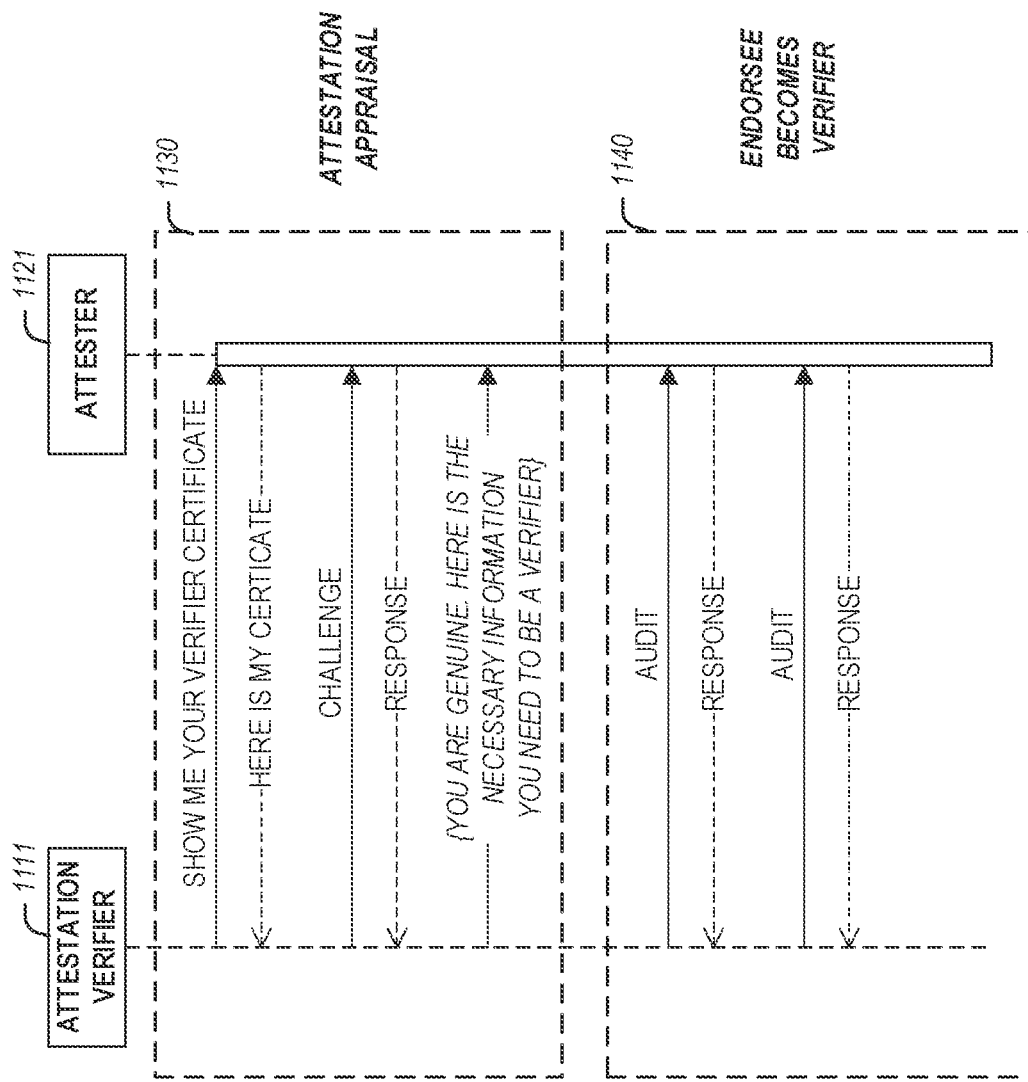
FIG. 11 depicts an attestation role delegation approach, according to an example.
Figure 13:
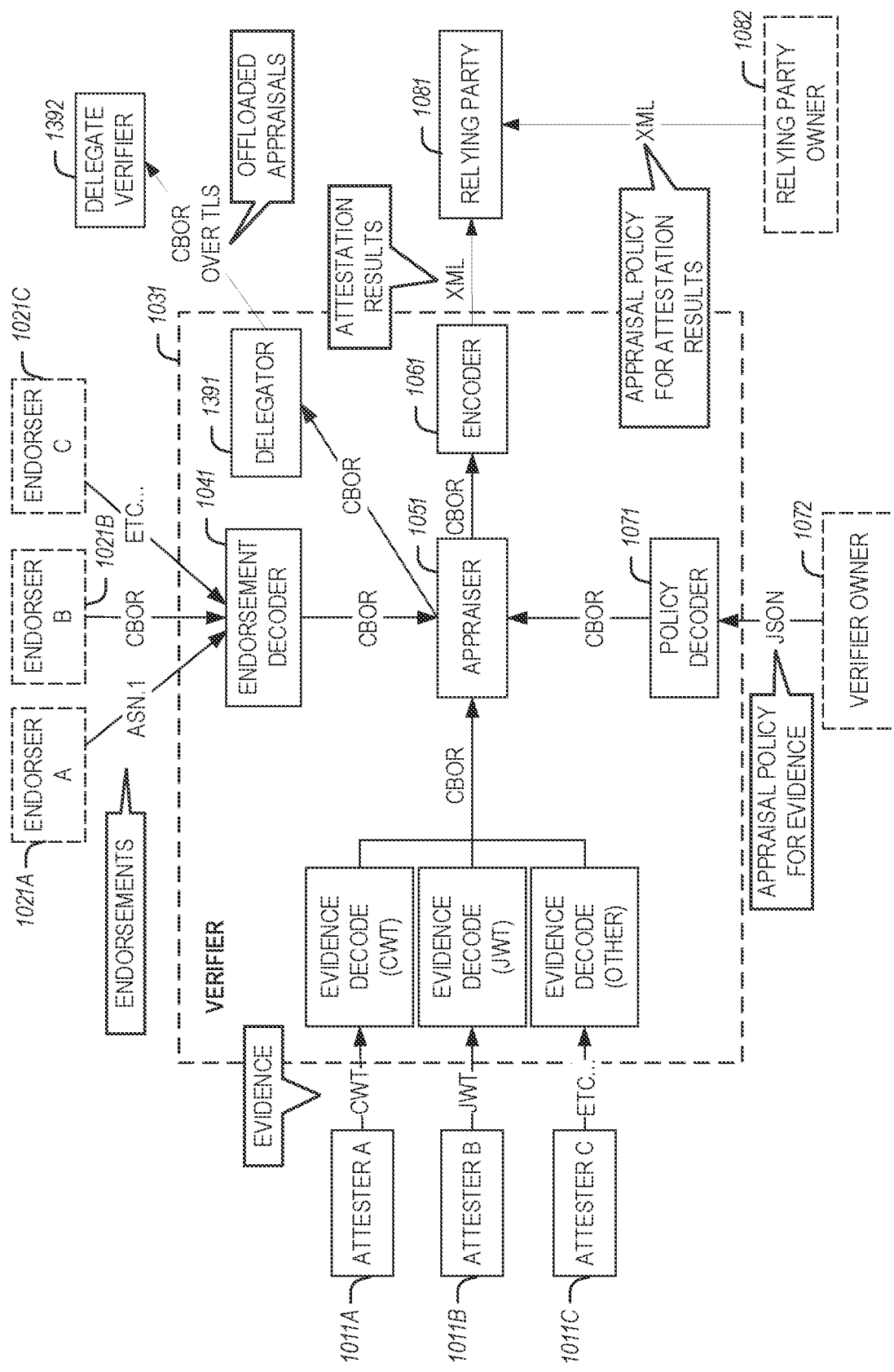
FIG. 13 depicts an attestation role architecture, with a verifier containing a delegator for offloading attestation appraisal functions, according to an example.

FIG. 11 depicts an attestation role delegation process, described in more detail as follows. These and other "attestation delegation" operations may be implemented as electronic operations (e.g., steps, functions, procedures, logic, automations, etc.) in a computer system, device, or node, as discussed herein. As a first step to delegation, attestation is recursively applied to establish a basis for trusting the delegate verifier. In the recursive application of attestation, the attestation roles are performed by each node where the prospective delegate performs the attester role and the verifier continues as a verifier; however, a prospective delegate may also implement a relying party role where the decision to accept or reject the prospective delegate is a decision of the delegator (as depicted in FIG. 13, in more detail below).

Before the attestation process, the verifier 1111 attests the authenticity of the attester 1121, who must provide evidence for verifier and successfully appraise the attestation challenge (appraisal operations 1130). The attester collects trustworthiness claims about itself by measuring the software and other configuration or settings that are subject to change from a previous attestation. The attester provides both a legitimate certificate certifying its device identity and evidence signed by the certificate private key. The verifier may supply a nonce or other freshness challenge to be included with evidence.

If the verifier's appraisal is successful, the verifier accepts a policy from the orchestrator or other network operations source that authorizes delegation of the attestation verifier role to another device (e.g., the attester 1121).

Figure 12:
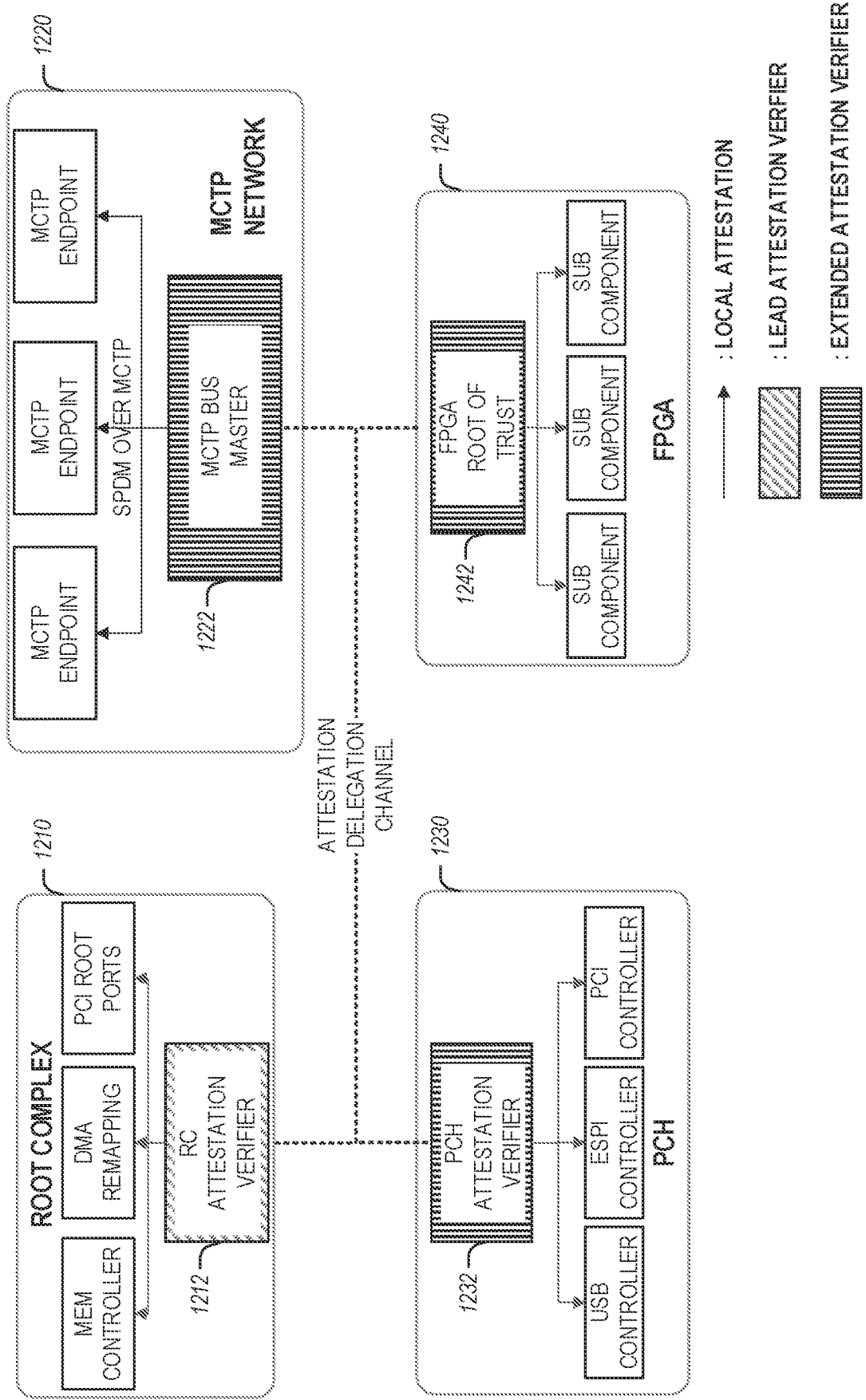
FIG. 12 depicts a verifier delegation approach in a complex device mesh, according to an example.

After successful attestation appraisal, the attester may be endorsed to become a new verifier in the system (endorsee operations 1140). It may be authorized to perform the role of attestation verifier for some, or all of its downstream devices as shown in FIG. 12. Additionally, or alternatively, it may be authorized to perform local attestation verification for a complex device that includes multiple local attesters and produces a report for the composition of local components that is conveyed to a remote verifier in response to an attestation challenge.

The new node may be authorized to grant attestation role privileges further to other attesters joining/re-joining/already joined to the network. The original verification endorser may periodically audit the verification endorsee (shown in endorsee operations 1140) to ensure it is working without being compromised. If an endorsee fails to respond to the audit, all of the downstream nodes are deemed not trusted and put into an exclusion list. This event can be broadcast to all upstream nodes to notify/update the exclusion list, such as where traffic from the nodes in the exclusion list are not trusted.

FIG. 12 depicts a verifier delegation in a complex device mesh. In this example, root complex (RC) 1210, Management Component Transport Protocol (MCTP) network 1220, Platform Controller Hub (PCH) 1230, and Field Programmable Gate Array (FPGA) 1240 elements establish four separate domains, and each has its own root of trust (e.g., RC attestation verifier 1212, MCTP bus master 1222, PCH attestation verifier 1232, FPGA RoT 1242) and may be an attester to each other. In this example, the root complex 1210 serves as the lead attestation verifier. The root complex 1210 attests and appraises the attester (for example the MCTP bus master 1222) and if successful, delegates the verifier role to the MCTP bus master. At this point, the MCTP bus master 1222 is delegated as verifier role to perform local attestation to all MCTP endpoints using a Security Protocol and Data Model (SPDM) protocol and hide a graph data of attestation from the lead attestation verifier (e.g., the root complex 1210 in this example).

FIG. 13 further depicts an attestation roles architecture, with a verifier node 1031 containing a delegator 1391 for offloading appraisal functions. This figure includes elements similar to those described in FIG. 10, but also includes additional features added to the verifier node 1031 (a delegator function 1391) for offloading appraisal functions to a remote (delegate) verifier/appraiser node 1392. The offload introduces a minimum of additional overhead for encoding attestation information that may include evidence, endorsement and policy. The internal (to the verifier) representation, here shown as CBOR, allows the delegate to process appraisals using the internal encoding and may benefit from pre-staged appraisal workloads. For example, the lead appraiser 1051 may build a logical device map out of evidence and another from endorsements then relate the two maps for efficient map traversals.

Figure 14:
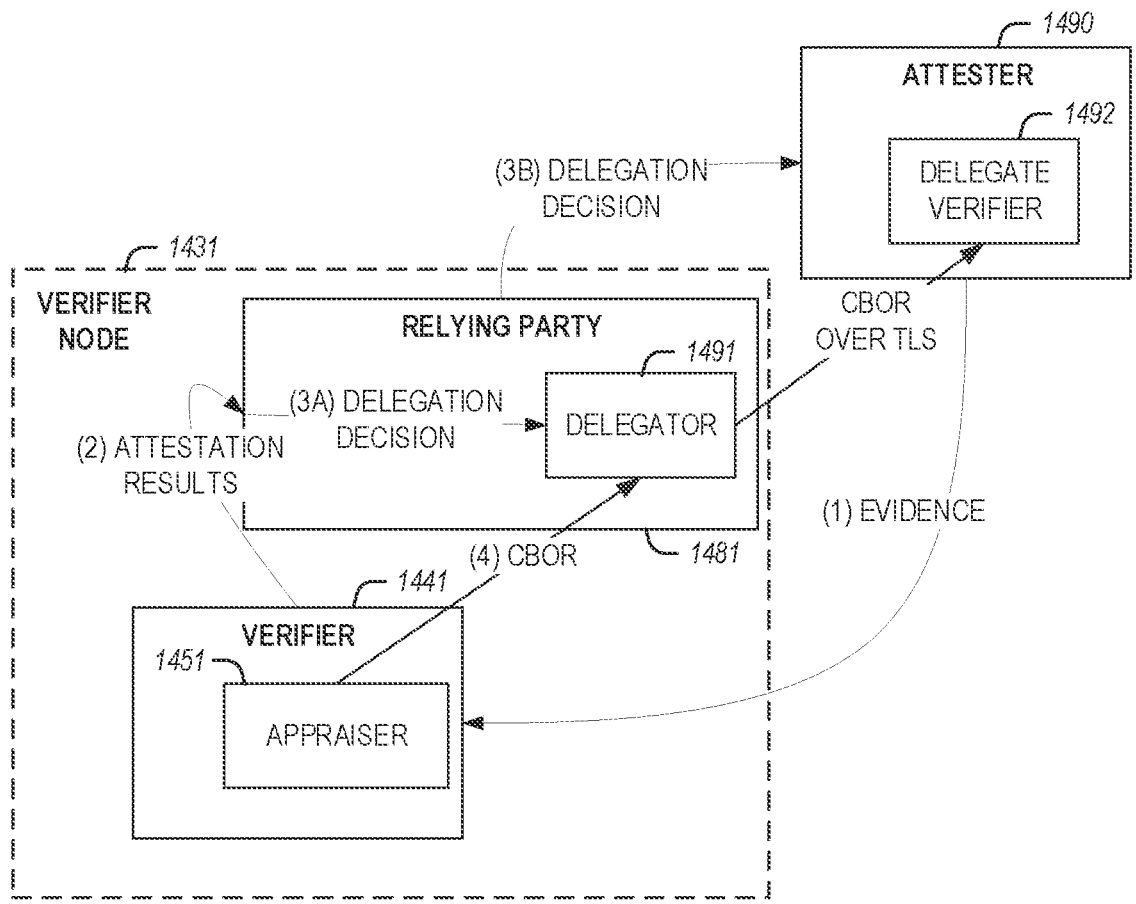
FIG. 14 depicts a recursive attestation process and related functions, according to an example.

FIG. 14 depicts recursive attestation examples, consistent with the delegated attestation approaches discussed above.

Recursive attestation is a way of establishing trust between a prospective delegate verifier where attestation is used as part of "onboarding" the delegate and where the delegate assumes the role of attester, the verifier retains the role of verifier, and the verifiers' delegator function performs the relying party role locally.

As a brief explanation of steps depicted in FIG. 14:

(1) Delegate verifier 1492 as attester 1490 supplies evidence about the network node and the environment that implements the delegate verifier 1492 function.

(2) The appraiser 1451 as verifier 1441 (operating essentially in the same role, within the verifier node 1431) performs a local appraisal to produce an attestation result.

(3a) The delegator 1491 as a local relying party 1481 evaluates the attestation results (assuming the attester 1490 is trustworthy for delegate verifier 1492 workloads) and authorizes the delegator 1491 to schedule appraiser 1451 workloads on the delegate verifier 1492 in future load balancing decisions.

(3b) The attester 1490 is notified of the attestation outcome and the decision to use (or not) the prospective delegate verifier 1492. This completes the delegation. Subsequent additional flows may be needed to configure the delegate verifier 1492 for normal operation such as provisioning of keys, trust anchors, policies for exchanging appraisal workloads and policies for formatting and evaluating workloads.

In further examples, the attestation delegation techniques discussed herein are applicable to a composite device pattern, and may be applicable to various forms of delegated verification workloads. For instance, consider a composite device scenario where delegate verifiers are assigned for each of Attester A, B, C, etc., and where the A delegate also serves as a workload scheduler for B, C, etc. One relevant use case is a local delegated verifier where there is a Platform Active Root of Trust (PaRoT) on the local machine that normally does all the verifications for local components. This may be extended so that the device pattern can inform the lead verifier on how to partition local verification workloads. Here, a local delegate is not trusted until it has itself successfully passed an attestation verification. The first verification could be done remotely then the locally trusted node could become a delegated verifier for a different local attesting node until all the nodes are verified. Then subsequent verifications could be performed locally being careful not to schedule a local re-attestation on the same node that is a local delegated verifier. This approach would allow scalability within the local device for times when external connectivity is limited.

These attestation delegation concepts may be extended for network connected delegate verifiers where any single verified node can be the lead verifier/scheduler initially, and then applies the method of the previous paragraph to bootstrap other nodes into delegated verifiers (or a sub-component of a node that has completed node attestation verification). This allows a GOSSIP style approach to delegation of the verifier role. Such concepts may also be extended to include trusted execution domains (e.g., Intel software guard extensions (SOX) and trusted domain extensions (TDX) domains) as delegates subsequent to their attestation verification being successful. This would permit a TDX domain connected via TDX/IO to a DICE rooted device to become a delegate verifier for other local components.

Figure 15:
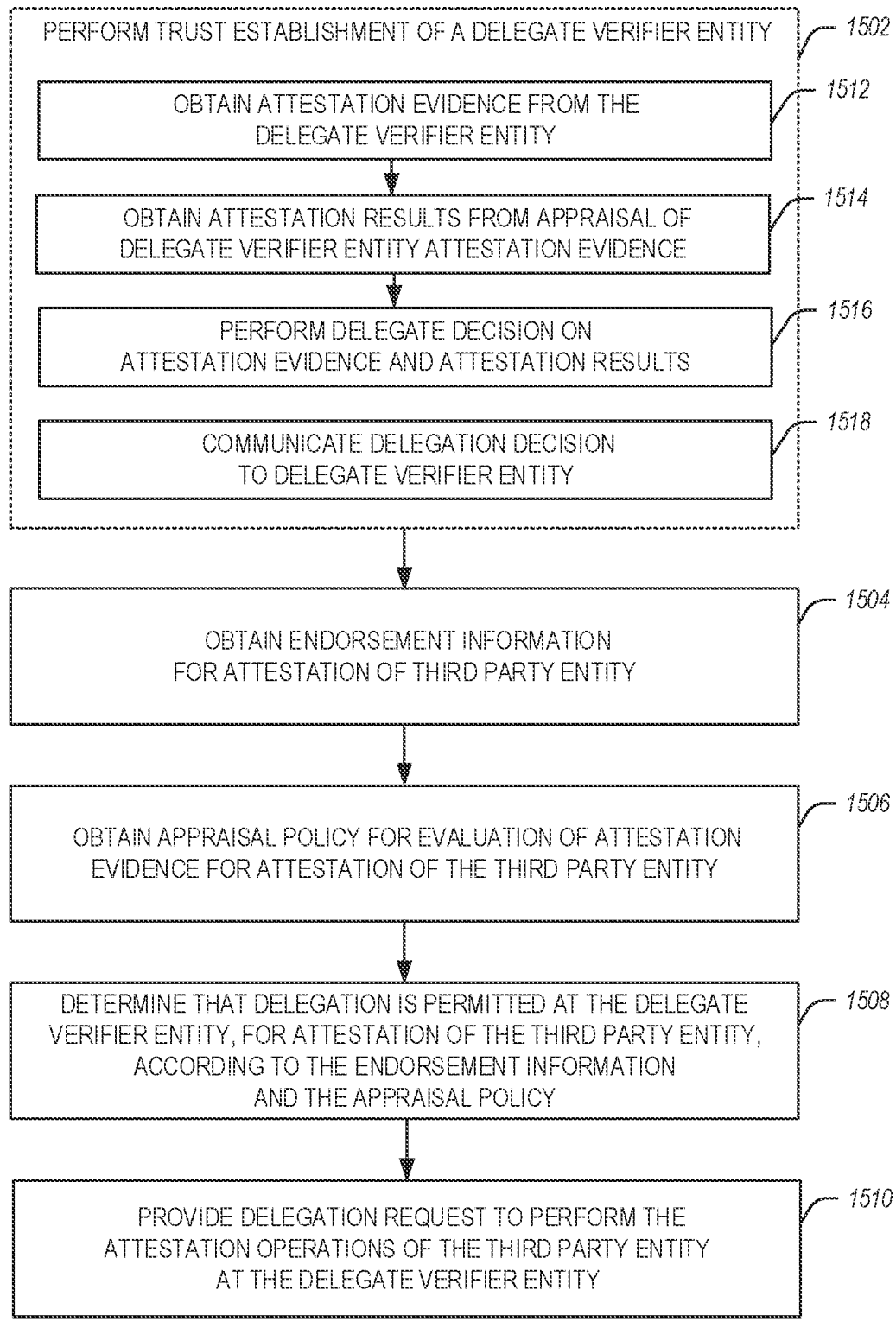
FIG. 15 illustrates a flowchart of a method of performing attestation delegation operations, according to various examples.

FIG. 15 illustrates a flowchart of a method of performing attestation delegation operations, according to an example. Although this flowchart is provided from the perspective of the verifier entity (verifier node), corresponding operations may be implemented by the delegate verifier. This method may be implemented by: a computing device, comprising processing circuitry and a memory device comprising instructions embodied thereon, with the instructions being executed by the processing circuitry to perform the attestation delegation operations. This method may be implemented by a non-transitory device-readable storage medium including instructions, wherein the instructions, when executed by a processing circuitry of a device, cause the processing circuitry to perform attestation operations. This method may also be implemented by a plurality of operations executed with a processor and memory of a device, to perform attestation delegation operations. This method may also be implemented by an apparatus comprising respective means to perform the following attestation delegation operations. In a specific example, the device or apparatus is a node operating in an internet of things (IoT) computing system (or IoT network) or in an edge computing network.

Operation 1502 is an optional operation (precondition) to establish trust with a delegate verifier entity. This operation may follow the recursive attestation to establish trust of the delegate verifier entity, such as discussed with reference to FIG. 14. In a specific example, operation 1502 includes sub-steps (sub-operations) to: obtain attestation evidence from the delegate verifier entity (operation 1512); obtain attestation results from appraisal of the attestation evidence (operation 1514); perform a delegate decision based on the provided attestation evidence and attestation results (operation 1516): and communicate results of the delegation decision to the delegate verifier entity (operation 1518).

Upon establishing trust with the delegate verifier entity, the following operations 1504-1508 refer to operations performed by a verifier entity computing device (e.g., lead attestation verifier) that enable a delegate (e.g., extended attestation verifier, configured as a verifier endorsee) to perform attestation of some third party entity. In an example, the delegate verifier entity is another computing device, and the verifier entity computing device and the another computing device are communicatively coupled on or otherwise communicate via a network or bus. In another example, the lead attestation verifier is a root complex implemented in hardware of the computing device, and the delegate verifier entity is another entity implemented in the hardware of the computing device.

Operation 1504 is an operation to obtain endorsement information for attestation of the third party entity. In an example, such endorsement information is provided from or originates from endorser entities in one or more encoded formats, and the endorsement information is decoded into a common format for evaluation.

Operation 1506 is an operation to obtain an appraisal policy, the appraisal policy defined for evaluation of attestation evidence for the attestation of the third party entity. In an example, such appraisal policy is provided from a verifier owner entity in one or more encoded formats, and the appraisal policy is decoded into a common format for evaluation (which may or may not be the same format as for the endorsement information).

Operation 1508 is an operation to determine, based on the endorsement information and the appraisal policy, that a delegation to the delegate verifier entity is permitted, to enable the delegate verifier entity to perform the attestation of the third party entity.

Operation 1510 is an operation to provide, to the delegate verifier entity, a delegation command (e.g., request, message, decision, or other communicated authorization) to perform the attestation of the third party entity. In an example, the delegation command authorizes the delegate verifier entity to perform attestation operations for a domain of entities including the third party entity. Specifically, such attestation operations may include those verifier operations described above with reference to FIGS. 9A to 9E, once the delegate verifier entity is properly delegated with the delegation command.

In further examples, the delegation command is provided to the delegate verifier entity in a defined format over a secure communication link. For instance, a Concise Binary Object Representation (CBOR) data format may be used.

Also in further examples, the computing device is configured as a lead attestation verifier, and may perform attestation of the third party entity or other entities (termed the "second entity") in addition to delegating such role to a delegate verifier. For instance, attestation operations for a second entity may include operations to: obtain evidence from one or more attesters regarding the second entity; apply the endorsement information and the appraisal policy for evidence, to the evidence from the one or more attesters; and communicate attestation results for the second entity to a relying party. In this example setting, attestation results may be encoded according to a defined format. Also in this example setting, the relying party may determine validity of the attestation results based on an appraisal policy for attestation results provided from a relying party owner, as the appraisal policy for attestation results is provided in a defined format. Also in this example setting, the evidence from the one or more attesters is provided in one or more formats, and the evidence is decoded into a common format for evaluation.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 is a computing system, comprising: processing circuitry; instructions; and a memory device (e.g., comprising instructions embodied thereon), wherein the instructions, which when executed by the processing circuitry, configure the processing circuitry to perform attestation operations to:

Example 1 is a computing device, comprising: at least one memory; instructions in the computing device; and processing circuitry to execute the instructions to perform attestation delegation operations that: obtain endorsement information for attestation of an entity; obtain an appraisal policy for evaluation of attestation evidence for the attestation of the entity; determine, based on the endorsement information and the appraisal policy, that delegation to a delegate verifier entity is permitted to perform the attestation of the entity; and provide, to the delegate verifier entity, a delegation command to perform the attestation of the entity, wherein the delegation command authorizes the delegate verifier entity to perform attestation operations for a domain of entities including the entity.

In Example 2, the subject matter of Example 1 optionally includes the delegation command being provided to the delegate verifier entity in a defined format over a secure communication link.

In Example 3, the subject matter of Example 2 optionally includes wherein the defined format being a Concise Binary Object Representation (CBOR) data format.

In Example 4, the subject matter of any one or more of Examples 1-3 optionally include the delegate verifier entity being another computing device, wherein the computing device and the another computing device are communicatively coupled on or otherwise communicate via a network or bus.

In Example 5, the subject matter of any one or more of Examples 1-4 optionally include the processing circuitry of the computing device being further configured to execute the instructions to perform trust establishment of the delegate verifier entity with operations that: obtain attestation evidence from the delegate verifier entity; obtain attestation results from appraisal of the attestation evidence; perform a delegation decision on the attestation evidence and the attestation results, the delegation decision to enable a delegation of attestation functions to the delegate verifier entity; and communicate the delegation decision to the delegate verifier entity.

In Example 6, the subject matter of any one or more of Examples 1-5 optionally include the endorsement information being provided from endorser entities in one or more encoded formats, the endorsement information being decoded into a common format for evaluation; and wherein the appraisal policy is provided from a verifier owner entity in one or more encoded formats, the appraisal policy being decoded into a common format for evaluation.

In Example 7, the subject matter of any one or more of Examples 1-6 optionally include the computing device being configured as a lead attestation verifier and wherein the delegate verifier entity is another computing device configured as a verifier endorsee, wherein the processing circuitry of the computing device is further to execute the instructions to perform attestation operations for a second entity, with operations that: obtain evidence from one or more attesters regarding the second entity; apply the endorsement information and the appraisal policy for evidence, to the evidence from the one or more attesters; and communicate attestation results for the second entity to a relying party.

In Example 8, the subject matter of Example 7 optionally includes the attestation results being encoded according to a defined format.

In Example 9, the subject matter of any one or more of Examples 7-8 optionally include the relying party determining validity of the attestation results based on an appraisal policy for attestation results provided from a relying party owner, and wherein the appraisal policy for attestation results is provided in a defined format.

In Example 10, the subject matter of any one or more of Examples 7-9 optionally include the evidence from the one or more attesters being provided in one or more formats, and wherein the evidence is decoded into a common format for evaluation.

In Example 11, the subject matter of any one or more of Examples 1-10 optionally include the attestation delegation operations being performed by a verifier that is a root complex implemented in hardware of the computing device, and wherein the delegate verifier entity is another entity implemented in the hardware of the computing device.

Example 12 is a non-transitory device-readable storage medium including instructions, wherein the instructions, when executed by a processing circuitry of a computing device, cause the processing circuitry to perform attestation delegation operations to: obtain endorsement information for attestation of an entity; obtain an appraisal policy for evaluation of attestation evidence for the attestation of the entity; determine, based on the endorsement information and the appraisal policy, that delegation to a delegate verifier entity is permitted to perform the attestation of the entity; and provide, to the delegate verifier entity, a delegation command to perform the attestation of the entity, wherein the delegation command authorizes the delegate verifier entity to perform attestation operations for a domain of entities including the entity.

In Example 13, the subject matter of Example 12 optionally includes the delegation command being provided to the delegate verifier entity in a defined format over a secure communication link.

In Example 14, the subject matter of Example 13 optionally includes the defined format being a Concise Binary Object Representation (CBOR) data format.

In Example 15, the subject matter of any one or more of Examples 12-14 optionally include the delegate verifier entity being another computing device, wherein the computing device and the another computing device are communicatively coupled on or otherwise communicate via a network or bus.

In Example 16, the subject matter of any one or more of Examples 12-15 optionally include the instructions further causing the processing circuitry to perform trust establishment of the delegate verifier entity with operations that: obtain attestation evidence from the delegate verifier entity; obtain attestation results from appraisal of the attestation evidence; perform a delegation decision on the attestation evidence and the attestation results, the delegation decision to enable a delegation of attestation functions to the delegate verifier entity; and communicate the delegation decision to the delegate verifier entity.

In Example 17, the subject matter of any one or more of Examples 12-16 optionally include the endorsement information being provided from endorser entities in one or more encoded formats, the endorsement information being decoded into a common format for evaluation; and wherein the appraisal policy is provided from a verifier owner entity in one or more encoded formats, the appraisal policy being decoded into a common format for evaluation.

In Example 18, the subject matter of any one or more of Examples 12-17 optionally include the computing device being configured as a lead attestation verifier and wherein the delegate verifier entity is another computing device configured as a verifier endorsee, wherein the processing circuitry of the computing device is further to execute the instructions to perform attestation operations for a second entity, with operations that: obtain evidence from one or more attesters regarding the second entity; apply the endorsement information and the appraisal policy for evidence, to the evidence from the one or more attesters; and communicate attestation results for the second entity to a relying party.

In Example 19, the subject matter of Example 18 optionally includes the attestation results being encoded according to a defined format.

In Example 20, the subject matter of any one or more of Examples 18-19 optionally include the relying party determining validity of the attestation results based on an appraisal policy for attestation results provided from a relying party owner, and wherein the appraisal policy for attestation results is provided in a defined format.

In Example 21, the subject matter of any one or more of Examples 18-20 optionally wherein the evidence from the one or more attesters being provided in one or more formats, and wherein the evidence is decoded into a common format for evaluation.

In Example 22, the subject matter of any one or more of Examples 12-21 optionally include the attestation delegation operations being performed by a verifier that is a root complex implemented in hardware of the computing device, and wherein the delegate verifier entity is another entity implemented in the hardware of the computing device.

Example 23 is a method, comprising a plurality of operations executed with a processor and memory of a computing device, to perform attestation delegation operations comprising: obtaining endorsement information for attestation of an entity; obtaining an appraisal policy for evaluation of attestation evidence for the attestation of the entity; determining, based on the endorsement information and the appraisal policy, that delegation to a delegate verifier entity is permitted to perform the attestation of the entity; and providing, to the delegate verifier entity, a delegation command to perform the attestation of the entity, wherein the delegation command authorizes the delegate verifier entity to perform attestation operations for a domain of entities including the entity.

In Example 24, the subject matter of Example 23 optionally includes the delegation command being provided to the delegate verifier entity in a defined format over a secure communication link.

In Example 25, the subject matter of Example 24 optionally includes the defined format being a Concise Binary Object Representation (CBOR) data format.

In Example 26, the subject matter of any one or more of Examples 23-25 optionally include the delegate verifier entity being another computing device, wherein the computing device and the another computing device are communicatively coupled on or otherwise communicate via a network or bus.

In Example 27, the subject matter of any one or more of Examples 23-26 optionally include the method further comprising performing trust establishment of the delegate verifier entity, with operations comprising: obtaining attestation evidence from the delegate verifier entity; obtaining attestation results from appraisal of the attestation evidence; performing a delegation decision on the attestation evidence and the attestation results, the delegation decision to enable a delegation of attestation functions to the delegate verifier entity; and communicating the delegation decision to the delegate verifier entity.

In Example 28, the subject matter of any one or more of Examples 23-27 optionally include the endorsement information being provided from endorser entities in one or more encoded formats, the endorsement information being decoded into a common format for evaluation; and wherein the appraisal policy is provided from a verifier owner entity in one or more encoded formats, the appraisal policy being decoded into a common format for evaluation.

In Example 29, the subject matter of any one or more of Examples 23-28 optionally include the computing device being configured as a lead attestation verifier and wherein the delegate verifier entity is another computing device configured as a verifier endorsee, the method further comprising performing attestation operations for a second entity, with operations comprising: obtaining evidence from one or more attesters regarding the second entity; applying the endorsement information and the appraisal policy for evidence, to the evidence from the one or more attesters; and communicating attestation results for the second entity to a relying party.

In Example 30, the subject matter of Example 29 optionally includes the attestation results being encoded according to a defined format.

In Example 31, the subject matter of any one or more of Examples 29-30 optionally include the relying party determining validity of the attestation results based on an appraisal policy for attestation results provided from a relying party owner, and wherein the appraisal policy for attestation results is provided in a defined format.

In Example 32, the subject matter of any one or more of Examples 29-31 optionally include the evidence from the one or more attesters being provided in one or more formats, and wherein the evidence is decoded into a common format for evaluation.

In Example 33, the subject matter of any one or more of Examples 23-32 optionally include the attestation delegation operations being performed by a verifier that is a root complex implemented in hardware of the computing device, and wherein the delegate verifier entity is another entity implemented in the hardware of the computing device.

Example 34 is an apparatus to perform attestation delegation operations, comprising: means for obtaining endorsement information for attestation of an entity; means for obtaining an appraisal policy for evaluation of attestation evidence for the attestation of the entity; means for determining, based on the endorsement information and the appraisal policy, that delegation to a delegate verifier entity is permitted to perform the attestation of the entity; and means for providing, to the delegate verifier entity, a delegation command to perform the attestation of the entity, wherein the delegation command authorizes the delegate verifier entity to perform attestation operations for a domain of entities including the entity.

In Example 35, the subject matter of Example 34 optionally includes means for providing the delegation command to the delegate verifier entity in a defined format over a secure communication link.

In Example 36, the subject matter of Example 35 optionally includes means for encoding and decoding the delegation command in a defined format, including in a Concise Binary Object Representation (CBOR) data format.

In Example 37, the subject matter of any one or more of Examples 34-36 optionally include means for communicating with the delegate verifier entity, wherein the delegate verifier entity is another computing device, and wherein the computing device and the another computing device are communicatively coupled on or otherwise communicate via a network or bus.

In Example 38, the subject matter of any one or more of Examples 34-37 optionally include means for obtaining attestation evidence from the delegate verifier entity; means for obtaining attestation results from appraisal of the attestation evidence; means for performing a delegation decision on the attestation evidence and the attestation results, the delegation decision to enable a delegation of attestation functions to the delegate verifier entity; and means for communicating the delegation decision to the delegate verifier entity.

In Example 39, the subject matter of any one or more of Examples 34-38 optionally include means for decoding the endorsement information into a common format for evaluation, wherein the endorsement information is provided from endorser entities in one or more encoded formats; and means for decoding the appraisal policy into a common format for evaluation, wherein the appraisal policy is provided from a verifier owner entity in one or more encoded formats.

In Example 40, the subject matter of any one or more of Examples 34-39 optionally include wherein the apparatus is configured as a lead attestation verifier and wherein the delegate verifier entity is another computing device configured as a verifier endorsee, the apparatus further configured to perform attestation operations for a second entity, and the apparatus further comprising: means for obtaining evidence from one or more attesters regarding the second entity; means for applying the endorsement information and the appraisal policy for evidence, to the evidence from the one or more attesters; and means for communicating attestation results for the second entity to a relying party.

In Example 41, the subject matter of Example 40 optionally includes means for decoding the attestation results that are encoded according to a defined format.

In Example 42, the subject matter of any one or more of Examples 40-41 optionally include means for evaluating the appraisal policy for attestation results provided in a defined format, wherein the relying party determines validity of the attestation results based on an appraisal policy for attestation results provided from a relying party owner.

In Example 43, the subject matter of any one or more of Examples 40-42 optionally include means for decoding the evidence into a common format for evaluation, wherein the evidence from the one or more attesters is provided in one or more formats.

In Example 44, the subject matter of any one or more of Examples 34-43 optionally include means for configuring the apparatus as a lead attestation verifier using a root complex in hardware of the apparatus, wherein the delegate verifier entity is another entity implemented in the hardware of the apparatus.

Example 45 is at least one machine-readable medium including instructions that, when executed by processing circuitry, cause the processing circuitry to perform operations to implement any of Examples 1-44.

Example 46 is an apparatus comprising means to implement any of Examples 1-44.

Example 47 is a system to implement any of Examples 1-44.

Example 48 is a method to implement any of Examples 1-44.

Example 49 is a multi-tier edge computing system, comprising a plurality of edge computing nodes provided among on-premise edge, network access edge, or near edge computing settings, the plurality of edge computing nodes configured to perform any of the methods of Examples 1-44.

Example 50 is an edge computing system, comprising a plurality of edge computing nodes, each of the plurality of edge computing nodes configured to perform any of the methods of Examples 1-44.

Example 51 is an edge computing node, operable in a layer of an edge computing network as an aggregation node, network hub node, gateway node, or core data processing node, configured to perform any of the methods of Examples 1-44.

Example 52 is an edge computing network, comprising networking and processing components configured to provide or operate a communications network, to enable an edge computing system to implement any of the methods of Examples 1-44.

Example 53 is an edge computing system configured as an edge mesh, provided with a microservice cluster, a microservice cluster with sidecars, or linked microservice clusters with sidecars, configured to implement any of the methods of Examples 1-44.

Example 54 is an edge computing system, comprising circuitry configured to implement services with one or more isolation environments provided among dedicated hardware, virtual machines, containers, or virtual machines on containers, the edge computing system configured to implement any of the methods of Examples 1-44.

Example 55 is an edge computing system, comprising networking and processing components to communicate with a user equipment device, client computing device, provisioning device, or management device to implement any of the methods of Examples 1-44.

Example 56 is networking hardware with network functions implemented thereupon, operable within an edge computing system, the network functions configured to implement any of the methods of Examples 1-44.

Example 57 is acceleration hardware with acceleration functions implemented thereupon, operable in an edge computing system, the acceleration functions configured to implement any of the methods of Examples 1-44.

Example 58 is storage hardware with storage capabilities implemented thereupon, operable in an edge computing system, the storage hardware configured to implement any of the methods of Examples 1-44.

Example 59 is computation hardware with compute capabilities implemented thereupon, operable in an edge computing system, the computation hardware configured to implement any of the methods of Examples 1-44.

Example 60 is an edge computing system configured to implement services with any of the methods of Examples 1-44, with the services relating to one or more of: compute offload, data caching, video processing, network function virtualization, radio access network management, augmented reality, virtual reality, autonomous driving, vehicle assistance, vehicle communications, industrial automation, retail services, manufacturing operations, smart buildings, energy management, internet of things operations, object detection, speech recognition, healthcare applications, gaming applications, or accelerated content processing.

Example 61 is an apparatus of an edge computing system comprising: one or more processors and one or more computer-readable media comprising instructions that, when executed by the one or more processors, cause the one or more processors to perform any of the methods of Examples 1-44.

Example 62 is one or more computer-readable storage media comprising instructions to cause an electronic device of an edge computing system, upon execution of the instructions by one or more processors of the electronic device, to perform any of the methods of Examples 1-44.

Example 63 is a computer program used in an edge computing system, the computer program comprising instructions, wherein execution of the program by a processing element in the edge computing system is to cause the processing element to perform any of the methods of Examples 1-44.

Example 64 is an edge computing appliance device operating as a self-contained processing system, comprising a housing, case, or shell, network communication circuitry, storage memory circuitry, and processor circuitry adapted to perform any of the methods of Examples 1-44.

Example 65 is an apparatus of an edge computing system comprising means to perform any of the methods of Examples 1-44.

Example 66 is an apparatus of an edge computing system comprising logic, modules, or circuitry to perform any of the methods of Examples 1-44.

Example 67 is an edge computing system, including respective edge processing devices and nodes to invoke or perform any of the operations of Examples 1-44, or other subject matter described herein.

Example 68 is a client endpoint node, operable to invoke or perform the operations of any of Examples 1-44, or other subject matter described herein.

Example 69 is an aggregation node, network hub node, gateway node, or core data processing node, within or coupled to an edge computing system, operable to invoke or perform the operations of any of Examples 1-44, or other subject matter described herein.

Example 70 is an access point, base station, road-side unit, street-side unit, or on-premise unit, within or coupled to an edge computing system, operable to invoke or perform the operations of any of Examples 1-44, or other subject matter described herein.

Example 71 is an edge provisioning node, service orchestration node, application orchestration node, or multi-tenant management node, within or coupled to an edge computing system, operable to invoke or perform the operations of any of Examples 1-44, or other subject matter described herein.

Example 72 is an edge node operating an edge provisioning service, application or service orchestration service, virtual machine deployment, container deployment, function deployment, and compute management, within or coupled to an edge computing system, operable to invoke or perform the operations of any of Examples 1-44, or other subject matter described herein.

Example 73 is an edge computing system including aspects of network functions, acceleration functions, acceleration hardware, storage hardware, or computation hardware resources, operable to invoke or perform the use cases discussed herein, with use of any Examples 1-44, or other subject matter described herein.

Example 74 is an edge computing system adapted for supporting client mobility, vehicle-to-vehicle (V2V), vehicle-to-everything (V2X), or vehicle-to-infrastructure (V2I) scenarios, and optionally operating according to European Telecommunications Standards Institute (ETSI) Multi-Access Edge Computing (MEC) specifications, operable to invoke or perform the use cases discussed herein, with use of any of Examples 1-44, or other subject matter described herein.

Example 75 is an edge computing system adapted for mobile wireless communications, including configurations according to a 3GPP 4G/LTE or 5G network capabilities, operable to invoke or perform the use cases discussed herein, with use of any of Examples 1-44, or other subject matter described herein.

Example 76 is an edge computing node, operable in a layer of an edge computing network or edge computing system as an aggregation node, network hub node, gateway node, or core data processing node, operable in a close peer, local edge, enterprise edge, on-premise edge, near edge, middle, edge, or far edge network layer, or operable in a set of nodes having common latency, timing, or distance characteristics, operable to invoke or perform the use cases discussed herein, with use of any of Examples 1-44, or other subject matter described herein.

Example 77 is networking hardware, acceleration hardware, storage hardware, or computation hardware, with capabilities implemented thereupon, operable in an edge computing system to invoke or perform the use cases discussed herein, with use of any of Examples 1-44, or other subject matter described herein.

Example 78 is an apparatus of an edge computing system comprising: one or more processors and one or more computer-readable media comprising instructions that, when deployed and executed by the one or more processors, cause the one or more processors to invoke or perform the use cases discussed herein, with use of any of Examples 1-44, or other subject matter described herein.

Example 79 is one or more computer-readable storage media comprising instructions to cause an electronic device of an edge computing system, upon execution of the instructions by one or more processors of the electronic device, to invoke or perform the use cases discussed herein, with the use of any of Examples 1-44, or other subject matter described herein.

Example 80 is an apparatus of an edge computing system comprising means, logic, modules, or circuitry to invoke or perform the use cases discussed herein, with the use of any of Examples 1-44, or other subject matter described herein.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

What is claimed is:

1. A computing device to operate as a lead attestation verifier for an attestation procedure, the computing device comprising:
    at least one memory;
    instructions in the computing device; and
    processing circuitry to execute the instructions to perform attestation delegation operations that:
        obtain endorsement information for attestation of an entity;
        obtain an appraisal policy for evaluation of attestation evidence for the attestation of the entity;
        determine, based on the endorsement information and the appraisal policy, that delegation to a delegate verifier entity is permitted to perform the attestation of the entity, wherein the delegate verifier entity is another computing entity configured as a verifier endorsee of the attestation procedure; and
        provide, to the delegate verifier entity, a delegation command to perform the attestation of the entity, wherein the delegation command authorizes the delegate verifier entity to perform attestation operations with the attestation procedure for a domain of entities including the entity, and wherein the attestation procedure establishes a trusted context among the domain of entities to perform computing operations;
        wherein the attestation delegation operations are performed by a verifier having a root of trust established in secure hardware of the computing device.

2. The computing device of claim 1, wherein the delegation command is provided to the delegate verifier entity in a defined format over a secure communication link.

3. The computing device of claim 2, wherein the defined format is a Concise Binary Object Representation (CBOR) data format.

4. The computing device of claim 1, wherein the computing device and the another computing entity communicate via a network or bus.

5. The computing device of claim 1, wherein the processing circuitry of the computing device is further to execute the instructions to perform trust establishment of the delegate verifier entity with operations that:
    obtain additional attestation evidence from the delegate verifier entity;
    obtain attestation results from appraisal of the attestation evidence;
    perform a delegation decision on the additional attestation evidence and the attestation results, the delegation decision to enable a delegation of attestation functions to the delegate verifier entity; and
    communicate the delegation decision to the delegate verifier entity.

6. The computing device of claim 1,
    wherein the endorsement information is provided from endorser entities in one or more encoded formats, the endorsement information being decoded into a common format for evaluation; and
    wherein the appraisal policy is provided from a verifier owner entity in one or more encoded formats, the appraisal policy being decoded into a common format for evaluation.

7. The computing device of claim 1, wherein the processing circuitry of the computing device is further to execute the instructions to perform attestation evaluation operations for a second entity, with operations that:
    obtain evidence from one or more attesters regarding the second entity;
    apply the endorsement information and the appraisal policy for evidence, to the evidence from the one or more attesters; and
    communicate attestation results for the second entity to a relying party.

8. The computing device of claim 7, wherein the attestation results are encoded according to a defined format.

9. The computing device of claim 7, wherein the relying party determines validity of the attestation results based on an appraisal policy for attestation results provided from a relying party owner, and wherein the appraisal policy for attestation results is provided in a defined format.

10. The computing device of claim 7, wherein the evidence from the one or more attesters is provided in one or more formats, and wherein the evidence is decoded into a common format for evaluation.

11. The computing device of claim 1, wherein the delegate verifier entity is another entity implemented in hardware of the computing device.

12. A method performed by a computing device to operate as a lead attestation verifier for an attestation procedure, the method performing attestation delegation operations executed with a processor and memory of the computing device, the method comprising:
   obtaining endorsement information for attestation of an entity;
   obtaining an appraisal policy for evaluation of attestation evidence for the attestation of the entity;
   determining, based on the endorsement information and the appraisal policy, that delegation to a delegate verifier entity is permitted to perform the attestation of the entity, wherein the delegate verifier entity is another computing entity configured as a verifier endorsee of the attestation procedure; and
   providing, to the delegate verifier entity, a delegation command to perform the attestation of the entity, wherein the delegation command authorizes the delegate verifier entity to perform attestation operations with the attestation procedure for a domain of entities including the entity, and wherein the attestation procedure establishes a trusted context among the domain of entities to perform computing operations;
   wherein the attestation delegation operations are performed by a verifier having a root of trust established in secure hardware of the computing device.

13. The method of claim 12, wherein the delegation command is provided to the delegate verifier entity in a defined format over a secure communication link.

14. The method of claim 13, wherein the defined format is a Concise Binary Object Representation (CBOR) data format.

15. The method of claim 12, wherein the computing device and the another computing entity communicate via a network or bus.

16. The method of claim 12, the method further comprising performing trust establishment of the delegate verifier entity, with operations comprising:
   obtaining additional attestation evidence from the delegate verifier entity;
   obtaining attestation results from appraisal of the attestation evidence;
   performing a delegation decision on the additional attestation evidence and the attestation results, the delegation decision to enable a delegation of attestation functions to the delegate verifier entity; and
   communicating the delegation decision to the delegate verifier entity.

17. The method of claim 12,
   wherein the endorsement information is provided from endorser entities in one or more encoded formats, the endorsement information being decoded into a common format for evaluation; and
   wherein the appraisal policy is provided from a verifier owner entity in one or more encoded formats, the appraisal policy being decoded into a common format for evaluation.

18. The method of claim 12, the method further comprising performing attestation evaluation operations for a second entity, with operations comprising:
   obtaining evidence from one or more attesters regarding the second entity;
   applying the endorsement information and the appraisal policy for evidence, to the evidence from the one or more attesters; and
   communicating attestation results for the second entity to a relying party.

19. The method of claim 18, wherein the attestation results are encoded according to a defined format.

20. The method of claim 18, wherein the relying party determines validity of the attestation results based on an appraisal policy for attestation results provided from a relying party owner, and wherein the appraisal policy for attestation results is provided in a defined format.

21. The method of claim 18, wherein the evidence from the one or more attesters is provided in one or more formats, and wherein the evidence is decoded into a common format for evaluation.

22. The method of claim 12, wherein the delegate verifier entity is another entity implemented in hardware of the computing device.

23. A non-transitory device-readable storage medium including instructions, wherein the instructions, when executed by a processing circuitry of a computing device, cause the processing circuitry to operate as a lead attestation verifier for an attestation procedure, the attestation procedure causing the computing device to perform attestation delegation operations to:
   obtain endorsement information for attestation of an entity;
   obtain an appraisal policy for evaluation of attestation evidence for the attestation of the entity;
   determine, based on the endorsement information and the appraisal policy, that delegation to a delegate verifier entity is permitted to perform the attestation of the entity, wherein the delegate verifier entity is another computing device configured as a verifier endorsee of the attestation procedure; and
   provide, to the delegate verifier entity, a delegation command to perform the attestation of the entity, wherein the delegation command authorizes the delegate verifier entity to perform attestation operations with the attestation procedure for a domain of entities including the entity, and wherein the attestation procedure establishes a trusted context among the domain of entities to perform computing operations;
   wherein the attestation delegation operations are performed by a verifier having a root of trust established in secure hardware of the computing device.

24. The non-transitory device-readable storage medium of claim 23, wherein the delegation command is provided to the delegate verifier entity in a defined format over a secure communication link, and wherein the defined format is a Concise Binary Object Representation (CBOR) data format.

* * * * *